(12) United States Patent
Zhu et al.

(10) Patent No.: US 12,075,094 B2
(45) Date of Patent: Aug. 27, 2024

(54) SIGNALING IN TRANSFORM SKIP MODE

(71) Applicant: Bytedance Inc., Los Angeles, CA (US)

(72) Inventors: Weijia Zhu, San Diego, CA (US); Li Zhang, San Diego, CA (US); Jizheng Xu, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/494,934

(22) Filed: Oct. 6, 2021

(65) Prior Publication Data

US 2022/0030280 A1 Jan. 27, 2022

Related U.S. Application Data

(63) Continuation of application No. PCT/US2020/030979, filed on May 1, 2020.

(30) Foreign Application Priority Data

May 2, 2019 (WO) ................ PCT/CN2019/085405
Jun. 25, 2019 (WO) ................ PCT/CN2019/092831

(51) Int. Cl.
*H04N 19/70* (2014.01)
*H04N 19/132* (2014.01)
(Continued)

(52) U.S. Cl.
CPC ........... *H04N 19/70* (2014.11); *H04N 19/132* (2014.11); *H04N 19/159* (2014.11); *H04N 19/176* (2014.11); *H04N 19/96* (2014.11)

(58) Field of Classification Search
CPC .... H04N 19/70; H04N 19/132; H04N 19/159; H04N 19/176; H04N 19/96;
(Continued)

(56) References Cited

U.S. PATENT DOCUMENTS 6,393,059 B1   5/2002   Sugiyama
8,208,545 B2   6/2012   Seo et al.
(Continued)

FOREIGN PATENT DOCUMENTS

CN   1040441048 A   9/2014
CN   104380734 A    2/2015
(Continued)

OTHER PUBLICATIONS

Bross et al. "Non-CE8: Unified Transform Type Signalling and Residual Coding for Transform Skip Mode," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0464, 2019.
(Continued)

*Primary Examiner* — Matthew K Kwan
(74) *Attorney, Agent, or Firm* — Perkins Coie LLP

(57) ABSTRACT

Devices, systems and methods for coefficient coding in transform skip mode are described. An exemplary method for visual media processing includes: for encoding a current video block in a video region of a visual media data into a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

20 Claims, 23 Drawing Sheets

(51) Int. Cl.
*H04N 19/159* (2014.01)
*H04N 19/176* (2014.01)
*H04N 19/96* (2014.01)

(58) Field of Classification Search
CPC .. H04N 19/157; H04N 19/119; H04N 19/186; H04N 19/619; H04N 19/61; H04N 19/103; H04N 19/46; H04N 19/60; H04N 19/98; H04N 19/11; H04N 19/184; H04N 19/593
USPC .................................................. 375/240.26
See application file for complete search history.

(56) References Cited

U.S. PATENT DOCUMENTS

| | | | |
|---|---|---|---|
| 9,641,844 B2 | 5/2017 | Kim et al. | |
| 9,648,335 B2 | 5/2017 | Rapaka et al. | |
| 9,667,990 B2 | 5/2017 | Chen et al. | |
| 9,716,894 B2 | 7/2017 | Joshi et al. | |
| 9,749,661 B2 | 8/2017 | Wang et al. | |
| 9,838,684 B2 | 12/2017 | Coban et al. | |
| 9,979,975 B2 | 5/2018 | Rapaka et al. | |
| 10,057,574 B2 | 8/2018 | Li et al. | |
| 10,382,754 B2 | 8/2019 | Li et al. | |
| 10,390,050 B2 | 8/2019 | An et al. | |
| 10,404,988 B2 | 9/2019 | Ye et al. | |
| 10,750,172 B2 | 8/2020 | Vanam et al. | |
| 10,812,817 B2 | 10/2020 | Li et al. | |
| 10,939,096 B2 | 3/2021 | Xiu et al. | |
| 11,070,812 B2 | 7/2021 | Coban et al. | |
| 11,146,785 B2 | 10/2021 | Zhang et al. | |
| 11,159,816 B2 | 10/2021 | Liu et al. | |
| 11,159,817 B2 | 10/2021 | Zhang et al. | |
| 11,197,003 B2 | 12/2021 | Zhang et al. | |
| 11,431,966 B2 | 8/2022 | Zhu et al. | |
| 11,431,984 B2 | 8/2022 | Zhu et al. | |
| 11,438,597 B2 | 9/2022 | Zhu et al. | |
| 11,438,602 B2 | 9/2022 | Zhu et al. | |
| 2007/0065026 A1 | 3/2007 | Lee et al. | |
| 2009/0161759 A1 | 6/2009 | Seo et al. | |
| 2010/0172582 A1 | 7/2010 | Ding | |
| 2012/0039388 A1 | 2/2012 | Kim et al. | |
| 2012/0128260 A1 | 5/2012 | Jung et al. | |
| 2012/0224640 A1 | 9/2012 | Sole Rojals et al. | |
| 2013/0114716 A1 | 5/2013 | Gao et al. | |
| 2013/0114730 A1 | 5/2013 | Joshi et al. | |
| 2013/0182758 A1 | 7/2013 | Seregin et al. | |
| 2013/0272379 A1 | 10/2013 | Sole Rojals et al. | |
| 2013/0343464 A1 | 12/2013 | Van Der Auwera et al. | |
| 2014/0016698 A1 | 1/2014 | Joshi et al. | |
| 2014/0098856 A1 | 4/2014 | Gu et al. | |
| 2014/0226721 A1 | 8/2014 | Joshi et al. | |
| 2014/0286400 A1 | 9/2014 | Joshi et al. | |
| 2014/0286413 A1 | 9/2014 | Joshi et al. | |
| 2014/0362917 A1 | 12/2014 | Joshi et al. | |
| 2015/0016501 A1 | 1/2015 | Guo et al. | |
| 2015/0063454 A1 | 3/2015 | Guo et al. | |
| 2015/0189272 A1 | 7/2015 | Peng et al. | |
| 2015/0189321 A1 | 7/2015 | Chen et al. | |
| 2015/0195545 A1 | 7/2015 | Wang et al. | |
| 2015/0264376 A1 | 9/2015 | Zou et al. | |
| 2016/0029035 A1* | 1/2016 | Nguyen ............... | H04N 19/186 375/240.12 |
| 2016/0100175 A1 | 4/2016 | Laroche et al. | |
| 2016/0100189 A1 | 4/2016 | Pang et al. | |
| 2017/0272782 A1 | 9/2017 | Li et al. | |
| 2017/0366807 A1 | 12/2017 | Thoreau et al. | |
| 2017/0366818 A1 | 12/2017 | Zhang et al. | |
| 2018/0014017 A1 | 1/2018 | Li et al. | |
| 2018/0063531 A1 | 3/2018 | Hu et al. | |
| 2018/0205947 A1 | 7/2018 | Xu et al. | |
| 2018/0213227 A1 | 7/2018 | Lim et al. | |
| 2018/0288415 A1 | 10/2018 | Li et al. | |
| 2018/0295382 A1 | 10/2018 | Liu et al. | |
| 2018/0324420 A1 | 11/2018 | Wang et al. | |
| 2018/0352226 A1 | 12/2018 | An et al. | |
| 2019/0045184 A1 | 2/2019 | Zhang et al. | |
| 2019/0364275 A1 | 11/2019 | Li et al. | |
| 2020/0236353 A1 | 7/2020 | Zhang et al. | |
| 2020/0260070 A1* | 8/2020 | Yoo ...................... | H04N 19/103 |
| 2020/0275111 A1 | 8/2020 | Zhao et al. | |
| 2020/0275121 A1 | 8/2020 | Zhao et al. | |
| 2020/0280742 A1* | 9/2020 | Ramasubramonian ...................... | H04N 19/176 |
| 2020/0296381 A1 | 9/2020 | Coban et al. | |
| 2020/0296390 A1 | 9/2020 | Chao et al. | |
| 2020/0296420 A1 | 9/2020 | Karczewicz et al. | |
| 2020/0329257 A1* | 10/2020 | Zhao ................... | H04N 19/615 |
| 2021/0029351 A1 | 1/2021 | Zhang et al. | |
| 2021/0029352 A1 | 1/2021 | Zhang et al. | |
| 2021/0112284 A1 | 4/2021 | Zhang et al. | |
| 2021/0274175 A1 | 9/2021 | Lim et al. | |
| 2021/0306654 A1* | 9/2021 | Lee ..................... | H04N 19/105 |
| 2021/0321136 A1* | 10/2021 | Jung .................... | H04N 19/119 |
| 2021/0385439 A1 | 12/2021 | Zhu et al. | |
| 2021/0385442 A1 | 12/2021 | Zhu et al. | |
| 2021/0385459 A1 | 12/2021 | Zhu et al. | |
| 2022/0038687 A1 | 2/2022 | Zhu et al. | |
| 2022/0038717 A1 | 2/2022 | Zhu et al. | |
| 2022/0060710 A1* | 2/2022 | Liu ..................... | H04N 19/132 |

FOREIGN PATENT DOCUMENTS

| | | |
|---|---|---|
| CN | 105075270 A | 11/2015 |
| CN | 105264891 A | 1/2016 |
| CN | 105556963 A | 5/2016 |
| CN | 106105227 A | 11/2016 |
| CN | 108028919 A | 5/2018 |
| CN | 108353167 A | 7/2018 |
| CN | 108366260 A | 8/2018 |
| CN | 108632611 A | 10/2018 |
| CN | 108712651 A | 10/2018 |
| CN | 109479129 A | 3/2019 |
| IN | 201627029614 A | 10/2016 |
| JP | 2016524409 A | 8/2016 |
| JP | 2018056685 A | 4/2018 |
| KR | 20150055858 A | 5/2015 |
| KR | 20160093061 A | 8/2016 |
| KR | 20190028525 A | 3/2019 |
| RU | 2580066 C2 | 7/2015 |
| RU | 2014145851 A | 6/2016 |
| RU | 2641252 C2 | 1/2018 |
| WO | 2011018965 A1 | 2/2011 |
| WO | 2013070707 A1 | 5/2013 |
| WO | 2013192537 A2 | 12/2013 |
| WO | 2017184970 A1 | 10/2017 |
| WO | 2017206803 A1 | 12/2017 |
| WO | 2018064948 A1 | 4/2018 |
| WO | 2019026807 A1 | 2/2019 |
| WO | 2019029951 A1 | 2/2019 |
| WO | 2020180102 A1 | 9/2020 |
| WO | 2020213931 A1 | 10/2020 |
| WO | 2020219512 A1 | 10/2020 |
| WO | 2020223449 A1 | 11/2020 |
| WO | 2020256389 A1 | 12/2020 |

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Bross et al. "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0280, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH. Mar. 19-27, 2019, document JVET-N1001, 2019.

(56) References Cited

OTHER PUBLICATIONS

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Mrak et al. "Improving Screen Content Coding in HEVC by Transform Skipping," 20th European Signal Processing Conference (EUSIPCO 2012), Bucharest, Romania, Aug. 27-31, 2012, retrieved on Jun. 11, 2020 from <https://www.eurasip.org/Proceedings/Eusipco/Eusipco2012/Conference/papers/1569583173.pdf>.
Said et al. "CE5: Per-Context CABAC Initialization with Single Window (Test 5.1.4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0413, 2019.
Sole et al. "Transform Coefficient Coding in HEVC," IEEE Transactions on Circuits and Systems for Video Technology, Dec. 2012, 22(12):1765-1777. Retrieved on Jun. 11, 2020 from <<https://ieeexplore.ieee.org/stamp/stamp.jsp?arnumber=6324418>.
http://phenix.it-sudparis.eu/jvet/doc_end_user/current_document.php?id=5755.
https://vcgit.hhi.fraunhofer.de/jvet/VVCSoftware_VTM/tags/VTM-4.0.
International Search Report and Written Opinion from International Patent Application No. PCT/US2020/028807 dated Aug. 4, 2020 (13 pages).
International Search Report and Written Opinion from International Patent Application No. PCT/US2020/028808 dated Jul. 2, 2020 (10 pages).
International Search Report and Written Opinion from International Patent Application No. PCT/US2020/030979 dated Aug. 4, 2020 (12 pages).
International Search Report and Written Opinion from International Patent Application No. PCT/US2020/030984 dated Aug. 4, 2020 (9 pages).
International Search Report and Written Opinion from International Patent Application No. PCT/US2020/034839 dated Sep. 22, 2020 (10 pages).
"Information Technology—High Efficiency Coding and Media Delivery in Heterogeneous Environments—Part 2: High Efficiency Video Coding" Apr. 20, 2018, ISO/DIS 23008, 4th Edition.
Karczewicz et al. "CE8-Related: Quantized Residual BDPCM," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0413, 2019.
Kim et al. "Improved Residual DPCM for HEVC Lossless Coding," 2014 27th SIBGRAPI Conference on Graphics, Patterns and Images, 2014, pp. 95-102.
Lee et al. "Improved Lossless Intra Coding for H.264/MPEG-4 AVC," IEEE Transactions on Image Processing, Sep. 2006, 15(9):2610-2615., retrieved on Jun. 15, 2020 from http:// dms.sejong.ac.kr/thesis/broad_thesis/01673442.pdf>entire document.
International Search Report and Written Opinion from International Patent Application No. PCT/US2020/029598 dated Jul. 6, 2020 (11 pages).
International Search Report and Written Opinion from International Patent Application No. PCT/US2020/029603 dated Jul. 9, 2020 (8 pages).
International Search Report and Written Opinion from International Patent Application No. PCT/US2020/030684 dated Jul. 21, 2020 (8 pages).
Non Final Office Action from U.S. Appl. No. 17/399,904 dated Dec. 29, 2021.
Non Final Office Action from U.S. Appl. No. 17/411,296 dated Nov. 8, 2021.
Non Final Office Action from U.S. Appl. No. 17/411,333 dated Nov. 26, 2021.
Non Final Office Action from U.S. Appl. No. 17/502,233 dated Feb. 10, 2022.
Non Final Office Action from U.S. Appl. No. 17/502,202 dated Feb. 11, 2022.
Kang et al. "Efficient Residual DPCM Using L1 Robust Linear Predicton in Screen Content Video Coding," IEEE Transactions on Multimedia, Oct. 2016, 18(10):2054-2065.
Final Office Action from U.S. Appl. No. 17/411,296 dated Feb. 22, 2022.
Final Office Action from U.S. Appl. No. 17/399,904 dated Apr. 15, 2022.
Abdoli et al. "CE8: BDPCM with Horizontal/Vertical Predictor and Independently Decodable Areas (Test 8.3.1b)," Joint Video Experts Team (JVET) of ITU-T SG 16 WP 3 and ISO/IEC JTC 1/SC 29/WG 11 13th Meeting, Marrakech, MA, Jan. 9-18, 2019, document JVET-M0057, 2019. (cited in EP 20798668.8 EESR mailed May 9, 2022).
Coban et al. "Unified Syntax for JVET-O0165/O0200/O0783 on TS and BDPCM Signalling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1136, 2019. (cited in EP 20794622.9 EESR mailed May 13, 2022).
Kang et al. "Non-RCE3: Explicit Signaling of Intra RDPCM," Joint Collaborative Team on Video Coding (JCT-VC) of ITU-T SG 16 WP 3 and ISO/IEC JTC 1/SC 29/WG 11 15th Meeting, Geneva, CH, Oct. 23-Nov. 1, 2013, document JCTVC-O0178, 2013. (cited in EP 20794015.6 EESR mailed May 2, 2022).
Schwarz et al. "Non-CE7: Alternative Entropy Coding for Dependent Quantization," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K0072, 2018. (cited in EP20791070.4 EESR mailed Apr. 4, 2022).
Sharman et al. "AHG5: Unifying DPCM," Joint Collaborative Team on Video Coding (JCT-VC) of ITU-T SG 16 WP 3 and ISO/IEC JTC 1/SC 29/WG 11, 15th Meeting, Geneva, CH Oct. 23-Nov. 1, 2013, document JCTVC-O0066, 2013. (cited in EP 20794622.9 EESR mailed May 13, 2022).
Tan et al. "Non-RCE3: Unified Lossless Residual Coding," Joint Collaborative Team on Video Coding (JCT-VC) of ITU-T SG 16 WP 3 and iSO/IEC JTC 1/SC 29/WG 11, 15th Meeting, Geneva, C, Oct. 23 to Nov. 1, 2013, document JCTVC-O0087, 2013. (cited in EP 20794015.6 EESR mailed May 2, 2022).
Tsukuba et al. "Non-CE6: On Transfrom Skip for Larger Block," Joint Vidoe Experts Team (JVET) of ITU-T SG 16 WP 3 and ISO/IEC JTC 1/SC 29/WG 11, 13th Meeting, Marrakech, MA, Jan. 9-18, 2019, document JVET-M0072, 2019. (cited in EP20791070.4 EESR mailed Apr. 4, 2022).
Xu et al. "Description of Core Experiment 8: Screen Content Coding Tools," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1028, 2018. (cited in EP20791070.4 EESR mailed Apr. 4, 2022).
Zhu et al. "Non-CE8: Adaptive Single/Dual Tree with IBC Simplification," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0258, 2019. (cited in EP20798575.5 mailed May 10, 2022).
Extended European Search Report from European Patent Application No. 20791070.4 dated Apr. 4, 2022 (11 pages).
Extended European Search Report from European Patent Application No. 20794015.6 dated May 2, 2022 (12 pages).
Extended European Search Report from European Patent Application No. 20794622.9 dated May 13, 2022 (11 pages).
Extended European Search Report from European Patent Application No. 20798668.8 dated May 9, 2022 (9 pages).
Extended European Search Report from European Patent Application No. 20798575.5 dated May 9, 2022 (12 pages).
Office Action from Indian Patent Application No. 202127047361 dated May 4, 2022 (7 pages).
Notice of Allowance from U.S. Appl. No. 17/502,233 dated Jun. 8, 2022.
Notice of Allowance from U.S. Appl. No. 17/411,296 dated Jun. 10, 2022.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001 v2 and v3, 2019.

(56) References Cited

OTHER PUBLICATIONS

Karczewicz et al. "CE8-Related: Sign Context Modeling and Level Mapping for TS Residual Coding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0455, 2019.

Xu et al. "CE8-Related: Combination of Test JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.

Notice of Reasons for Refusal from Japanese Patent Application No. 2021-563191 dated Dec. 20, 2022.

Clare et al. "CE8: BDPCM with harmonized residual coding and CCB limitation (CE8-3.1a, CE8-3.1b, C38-5.1a, CE8-5.1b)," Joint Video Experts Team (JVET)of ITU-T SG 16 WP 3 and ISO/IEC JTC 1/SC 29/WG 11 14th Meeting: Geneva, CH, Mar. 19-27, 2019, document No. JVET-N0214, 2019. (cited in JP2023-086493 OA mailed Mar. 26, 2024).

Han et al. "CE8-related: Block Size Limitation for IBC Mode," Joint Video Experts Team (JVET) of ITU-T SG 16 WP 3 and ISO/IEC JTC 1/SC 29/WG 11 14th Meeting: Geneva, CH, Mar. 19-27, 2019, document No. JVET-N0318, 2019.

Communication Pursuant to Article 94(3) EPC from European Patent 20799044.1 dated May 27, 2024 (5 pages).

\* cited by examiner

1200

1202 — for encoding a current video block in a video region of a visual media data into a bitstream representation of the visual media data, identifying usage of a coding mode and/or an intra prediction mode and/or a set of allowable intra prediction modes 1204 — upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation

1302 — for decoding a current video block in a video region of visual media data from a bitstream representation of the visual media data, identifying usage of a coding mode and/or an intra prediction mode and/or a set of allowable intra prediction modes 1304 — upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation

1402 — for decoding a current video block in a video region of visual media data from a bitstream representation of the visual media data, identifying usage of a coding mode and/or an intra prediction mode and/or a set of allowable intra prediction modes 1404 — upon identifying the usage, making a decision of whether to include or exclude, in the bitstream representation, a syntax element indicative of selectively applying a transform skip mode to the current video block, wherein, in the transform skip mode, a residual between the current video block and a prediction video block is represented in the bitstream representation of the visual media data without applying a transformation

FIG. 14

1500 — making a decision, for encoding a current video block in a video region of a visual media data into a bitstream representation of the visual media data, regarding a selective application of a single or dual tree coding structure based on or inferred from at least on determining that the dual tree coding structure is enabled 1504 — including a syntax element indicative of the selective application of the single or the dual tree in the bitstream representation

FIG. 15

SIGNALING IN TRANSFORM SKIP MODE

CROSS REFERENCE TO RELATED APPLICATIONS

This application is a continuation of International Application No. PCT/US2020/030979, filed on May 1, 2020, which claims the priority to and benefits of International Patent Application No. PCT/CN2019/085405, filed on May 2, 2019, and International Patent Application No. PCT/CN2019/092831, filed on Jun. 25, 2019. All the aforementioned patent applications are hereby incorporated by reference in their entireties.

TECHNICAL FIELD

This document is related to video and image coding/decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding/decoding, and specifically, coefficient coding in transform skip mode for video coding/decoding are described. The described methods may be applied to both the existing video coding standards (e.g., High Efficiency Video Coding (HEVC)) and future video coding standards (e.g., Versatile Video Coding (VVC)) or codecs.

In one exemplary aspect, a method of visual media processing is disclosed. The method includes for encoding a current video block in a video region of a visual media data into a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

In another exemplary aspect, a method of visual media processing is disclosed. The method includes for decoding a current video block in a video region of visual media data from a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

In yet another exemplary aspect, a method of visual media processing is disclosed. The method includes for decoding a current video block in a video region of visual media data from a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual between the current video block and a prediction video block is represented in the bitstream representation of the visual media data without applying a transformation.

In yet another exemplary aspect, a method of visual media processing is disclosed. The method includes making a decision, for encoding a current video block in a video region of a visual media data into a bitstream representation of the visual media data, regarding a selective application of a single or dual tree coding structure based on or inferred from at least on determining that the dual tree coding structure is enabled; and including a syntax element indicative of the selective application of the single or the dual tree in the bitstream representation.

In yet another exemplary aspect, a method of visual media processing is disclosed. The method includes parsing a syntax element from a bitstream representation of a visual media data comprising a video region comprising a current video block, wherein the syntax element is indicative of a selective application of a single or dual tree coding structure based on or inferred from at least on determining that the dual tree coding structure is enabled; and generating a decoded video region from the bitstream representation by decoding the current video block according to the syntax element.

In yet another exemplary aspect, a method of visual media processing is disclosed. The method includes determining, for conversion between a current video block of visual media data and a bitstream representation of the visual media, that intra block copy (IBC) mode is applied on a chroma component of the current video block; and deriving a motion information associated with a sub-block of the current video block using firstly-available samples included in a IBC-coded sub-region within a collocated luma block of the current video block.

In yet another exemplary aspect, a method of visual media processing is disclosed. The method includes determining, for conversion between a current video block of visual media data and a bitstream representation of the visual media, that intra block copy (IBC) mode is applied on the current video block; and including, in the bitstream representation, a syntax element indicative of a motion information associated with the current video block.

In yet another exemplary aspect, a method of visual media processing is disclosed. The method includes determining, for conversion between a current video block of visual media data and a bitstream representation of the visual media, that intra block copy (IBC) mode is applied on the current video block; and making a determination of whether to selectively include or exclude, in the bitstream representation, a syntax element indicative of a motion information associated with the current video block, based at least on one or more conditions.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 12 is a flowchart for an example for a visual media processing method.

FIG. 13 is a flowchart for an example for a visual media processing method.

FIG. 14 is a flowchart for an example for a visual media processing method.

FIG. 15 is a flowchart for an example for a visual media processing method.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to coefficient coding in a transform skip mode in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards [1,2]. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at: http://phenix.it-sudparis.eu/jvet/doc_end_user/current_document.php?id=5755

The latest reference software of VVC, named VTM, could be found at: https://vcgit.hhi.fraunhofer.de/jvet/VVCSoftware_VTM/tags/VTM-4.0

2.1 Intra Block Copy

Figure 1:
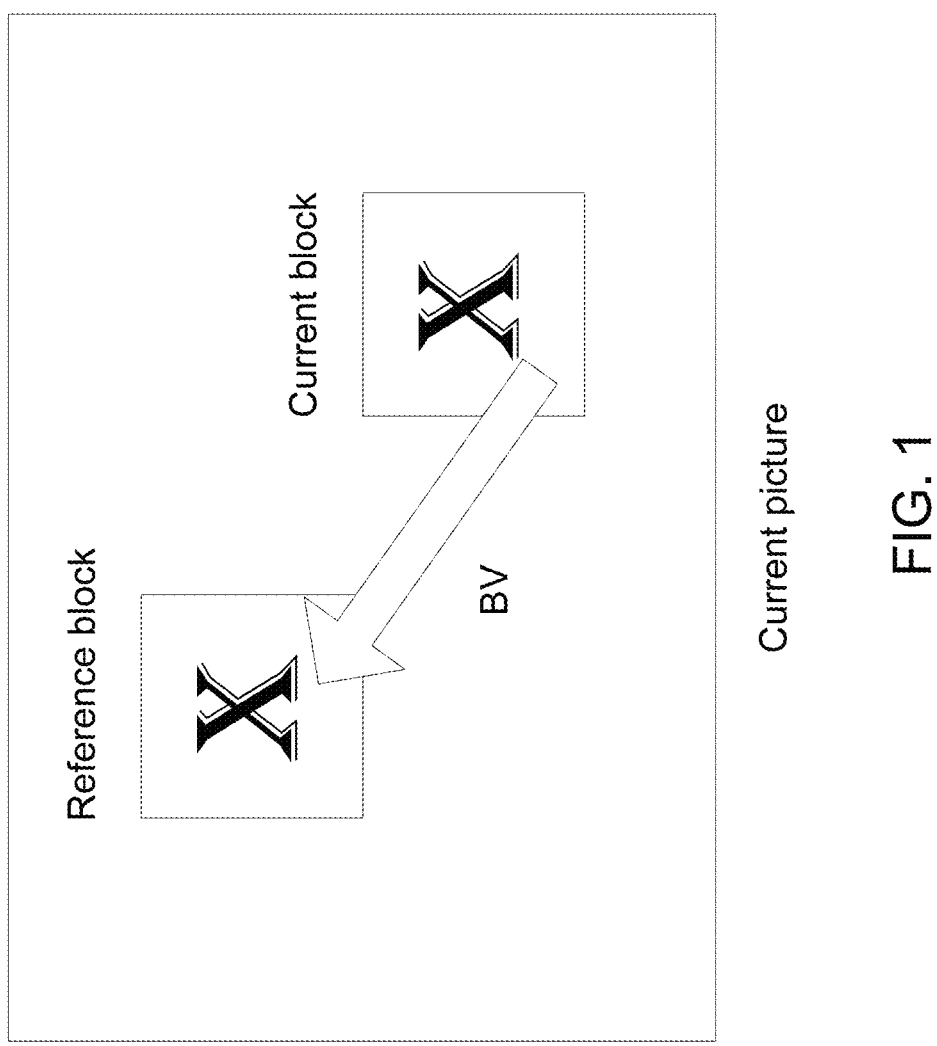
FIG. 1 shows an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g., in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:
The variables offsetX and offsetY are derived as follows:

offsetX=(ChromaArrayType==0)?0:(mvCLX[0]
&0x7?2:0) (8-106)

offsetY=(ChromaArrayType==0)?0:(mvCLX[1]
&0x7?2:0) (8-107)

It is a requirement of bitstream conformance that when the reference picture is the current picture, the luma motion vector mvLX shall obey the following constraints:
  When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.
  When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.
One or both the following conditions shall be true:
  The value of (mvLX[0]>>2)+nPbW+xB1+offsetX is less than or equal to 0.
  The value of (mvLX[1]>>2)+nPbH+yB1+offsetY is less than or equal to 0.
The following condition shall be true:

(xPb+(mvLX[0]>>2)+nPbSw−1+offsetX)/CtbSizeY−
xCurr/CtbSizeY<=yCurr/CtbSizeY−(yPb+
(mvLX[1]>>2)+nPbSh−1+offsetY)/CtbSizeY (8-108)

Thus, the case that the reference block overlaps with the current block or the reference block is outside of the picture will not happen. There is no need to pad the reference or prediction block.

2.3 IBC in VVC Test Model

In the current VVC test model, i.e., VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions A1, B1, B0, A0 and B2. The order of derivation is A1, B1, B0, A0 and B2. Position B2 is considered only when any PU of position A1, B1, B0, A0 is not available (e.g., because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check A0, A1 until an available candidate is found.
  Check B0, B1, B2 until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:
  Normal AMVP mode: quarter-luma-sample, integer-luma-sample or four-luma-sample.
  Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check three times for each MVD resolution, in VTM4, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore, affine parameters obtained in quarter-luma-sample MV precision affine inter mode is used as starting search point in 1/16 luma-sample and quarter-luma-sample MV precision affine inter modes.

2.5 Palette Mode

Figure 2:
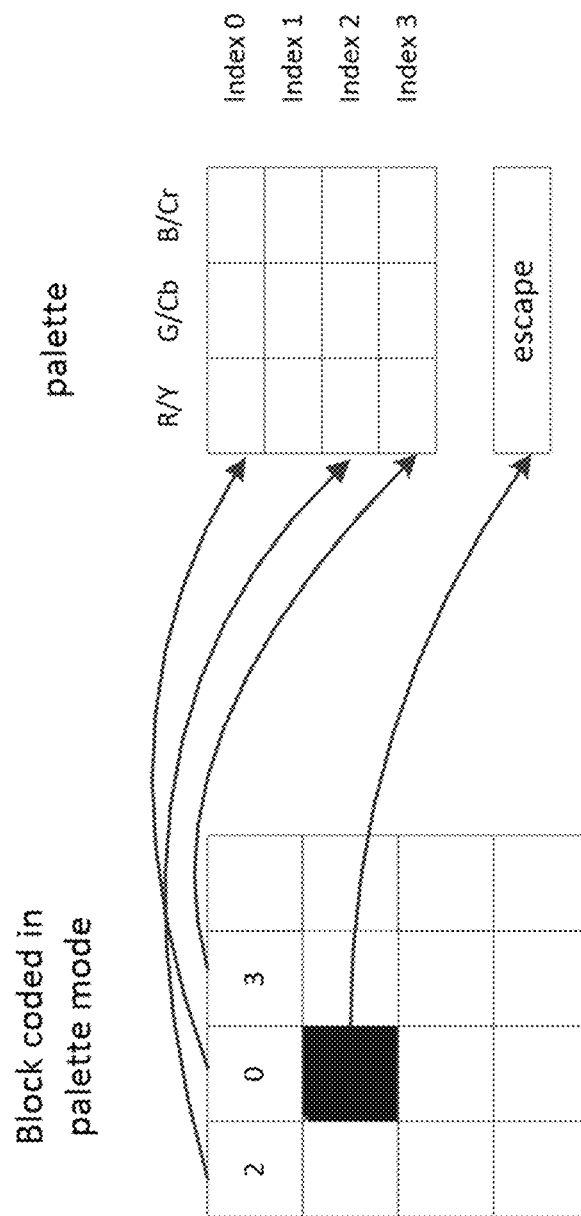
FIG. 2 shows an example of a block coded in palette mode.

The basic idea behind a palette mode is that the samples in the CU are represented by a small set of representative color values. This set is referred to as the palette. It is also possible to indicate a sample that is outside the palette by signaling an escape symbol followed by (possibly quantized) component values. This is illustrated in FIG. 2.

2.6 Palette Mode in HEVC Screen Content Coding Extensions (HEVC-SCC)

In the palette mode in HEVC-SCC, a predictive way is used to code the palette and index map.

2.6.1 Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor initializer entries signalled in the PPS. In HEVC-SCC, a palette predictor initializer of size 0 was enabled to allow explicit disabling of the palette predictor initialization at the PPS level.

Figure 3:
FIG. 3 shows an example of use of a palette predictor to signal palette entries.

For each entry in the palette predictor, a reuse flag is signaled to indicate whether it is part of the current palette. This is illustrated in FIG. 3. The reuse flags are sent using run-length coding of zeros. After this, the number of new palette entries are signaled using exponential Golomb code of order 0. Finally, the component values for the new palette entries are signaled.

2.6.2 Coding of Palette Indices

Figure 4:
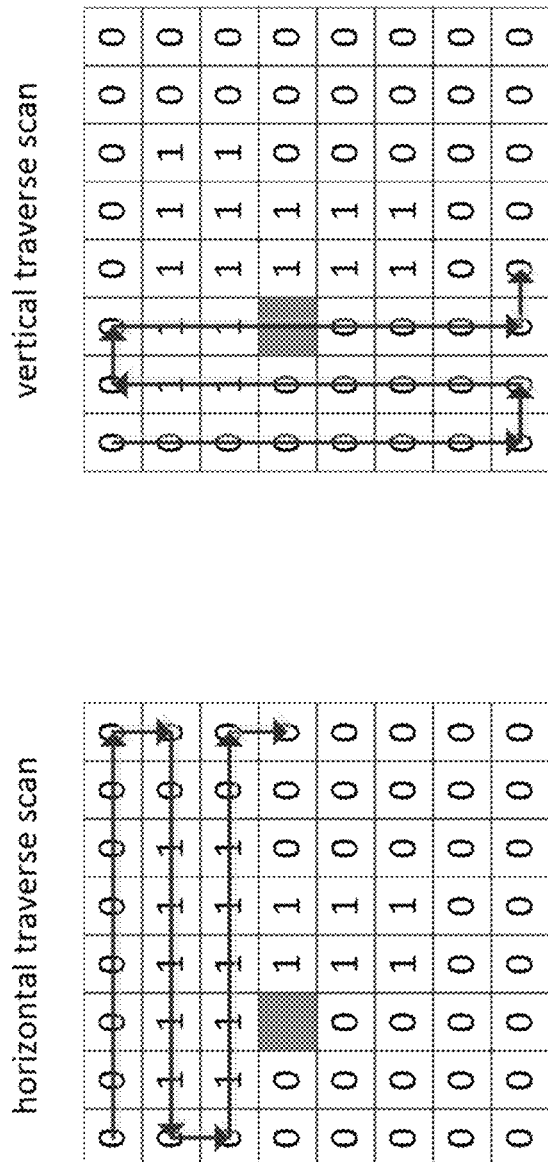
FIG. 4 shows an example of horizontal and vertical traverse scans.

The palette indices are coded using horizontal and vertical traverse scans as shown in FIG. 4. The scan order is explicitly signaled in the bitstream using the palette_transpose_flag. For the rest of the subsection it is assumed that the scan is horizontal.

Figure 5:
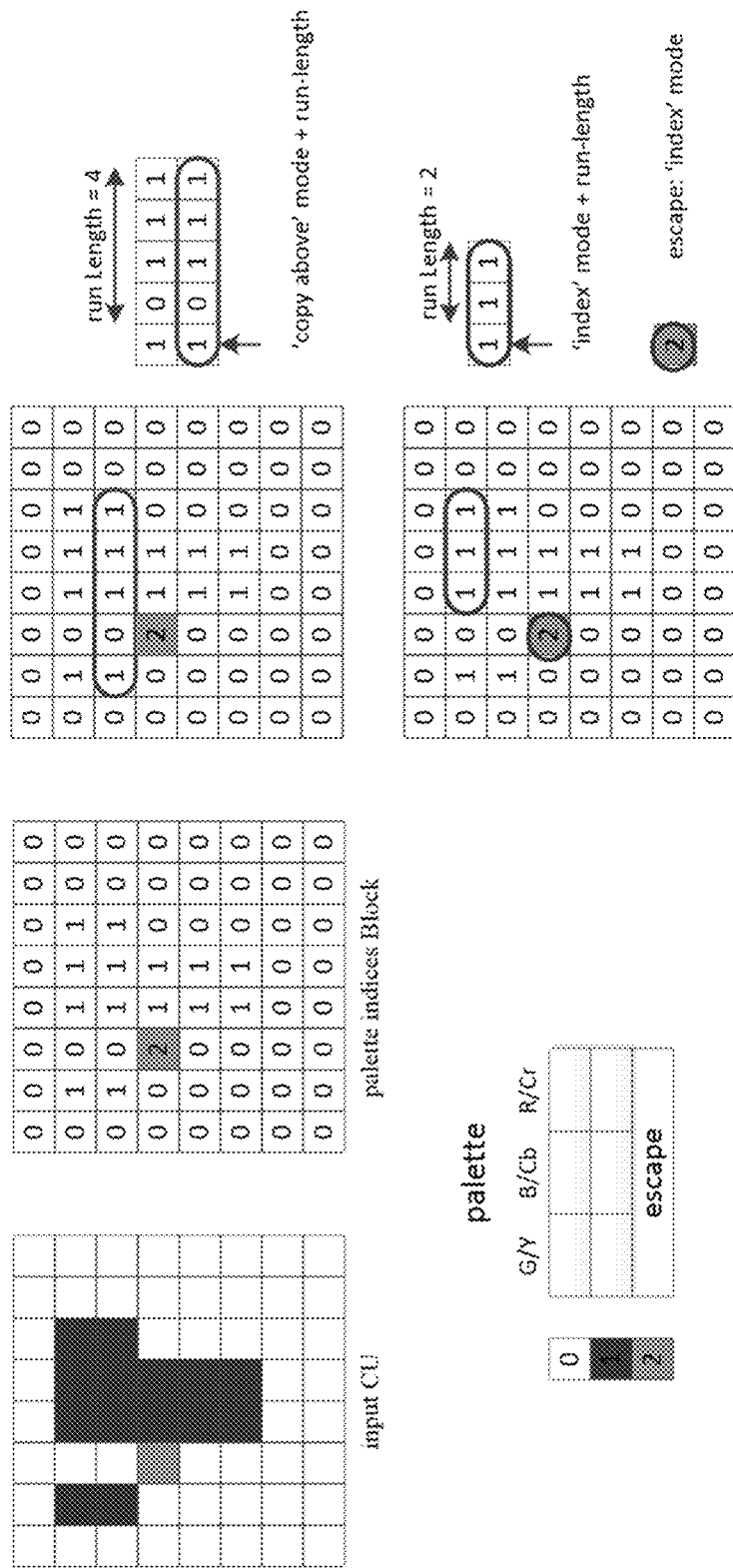
FIG. 5 shows an example of coding of palette indices.

The palette indices are coded using two main palette sample modes: 'INDEX' and 'COPY_ABOVE'. As explained previously, the escape symbol is also signaled as an 'INDEX' mode and assigned an index equal to the maximum palette size. The mode is signaled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

2.7 Coefficients Coding in Transform Skip Mode

In JVET-M0464 and JVET-N0280, several modifications are proposed on the coefficients coding in transform skip (TS) mode in order to adapt the residual coding to the statistics and signal characteristics of the transform skip levels.

The proposed modifications are listed as follows.

No last significant scanning position: Since the residual signal reflects the spatial residual after the prediction and no energy compaction by transform is performed for TS, the higher probability for trailing zeros or insignificant levels at the bottom right corner of the transform block is not given anymore. Thus, last significant scanning position signalling is omitted in this case.

Subblock CBFs: The absence of the last significant scanning position signalling requires the subblock CBF signalling with coded_sub_block_flag for TS to be modified as follows:

Due to quantization, the aforementioned sequence of insignificance may still occur locally inside a transform block. Thus, the last significant scanning position is removed as described before and coded_sub_block_flag is coded for all sub-blocks.

The coded_sub_block_flag for the subblock covering the DC frequency position (top-left subblock) presents a special case. In VVC Draft 3, the coded_sub_block_flag for this subblock is never signaled and always inferred to be equal to 1. When the last significant scanning position is located in another subblock, it means that there is at least one significant level outside the DC subblock. Consequently, the DC subblock may contain only zero/non-significant levels although the coded_sub_block_flag for this subblock is inferred to be equal to 1. With the absence of the last scanning position information in TS, the coded_sub_block_flag for each subblock is signaled. This also includes the coded_sub_block_flag for the DC subblock except when all other coded_sub_block_flag syntax elements are already equal to 0. In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0.

The context modeling for coded_sub_block_flag is changed. The context model index is calculated as the sum of the coded_sub_block_flag to the left and the coded_sub_block_flag above the current subblock instead of and a logical disjunction of both.

sig_coeff_flag context modelling: The local template in sig_coeff_flag context modeling is modified to only include the neighbor to the left ($NB_0$) and the neighbor above ($NB_1$) the current scanning position. The context model offset is just the number of significant neighboring positions sig_coeff_flag[$NB_0$]+sig_coeff_flag[$NB_1$]. Hence, the selection of different context sets depending on the diagonal d within the current transform block is removed. This results in three context models and a single context model set for coding the sig_coeff_flag flag.

abs_level_gt1_flag and par_level_flag context modelling: a single context model is employed for abs_level_gt1_flag and par_level_flag.

abs_remainder coding: Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. This motivates the following modifications of the abs_remainder syntax binarization and context modelling:

Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g., introducing abs_level_gt5_flag, abs_level_gt7_flag, and so on until a cutoff is reached. The cutoff itself is fixed to 5 (numGtFlags=5).

The template for the rice parameter derivation is modified, i.e., only the neighbor to the left and the neighbor above the current scanning position are considered similar to the local template for sig_coeff_flag context modeling.

coeff_sin_flag context modelling: Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

2.8 Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \le i \le M-1$, $0 \le j \le N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{i} \tilde{r}_{k,j}, \ 0 \leq i \leq (M-1), \ 0 \leq j \leq (N-1).$$

For horizontal case, $$Q(r_{i,j}) = \Sigma_{k=0}^{j} \tilde{r}_{i,k}, \ 0 \leq i \leq (M-1), \ 0 \leq j \leq (N-1).$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

The draft text changes of QR-BDPCM are shown as follows.

7.3.6.5 Coding Unit Syntax

| | Descriptor |
|---|---|
| coding_unit( x0, y0, cbWidth, cbHeight, treeType ) { | |
|   if( tile_group_type != I | | sps_ibc_enabled_flag ) { | |
|     if( treeType != DUAL_TREE_CHROMA ) | |
|       cu_skip_flag[ x0 ][ y0 ] | ae(v) |
|   if( cu_skip_flag[ x0 ][ y0 ] = = 0 && tile_group_type != I ) | |
|     pred_mode_flag | ae(v) |
|   if( ( ( tile_group_type = = I && cu_skip_flag[ x0 ][ y0 ] = =0 ) | | | |
|     ( tile_group_type != I && CuPredMode[ x0 ][ y0 ] != MODE_INTRA ) ) && | |
|     sps_ibc_enabled_flag ) | |
|     pred_mode_ibe_flag | ae(v) |
| } | |
| if( CuPredMode[ x0 ][ y0 ] = = MODE_INTRA ) { | |
|   if( pred_mode_flag = = MODE_INTRA && ( cIdx == 0 ) && | |
|     ( cbWidth <= 32 ) && ( CbHeight <= 32) ) { | |
|     bdpcm_flag[ x0 ][ y0 ] | ae(v) |
|     if( bdpcm_flag[ x0 ][ y0 ] ) { | |
|       bdpcm_dir_flag[ x0 ][ y0 ] | ae(v) |
|     } | |
|   else { | |
|   if( sps_pcm_enabled_flag && | |
|   cbWidth >= MinIpcmCbSizeY && cbWidth <= MaxIpcmCbSizeY && | |
|   cbHeight >= MinIpcmCbSizeY && cbHeight <= MaxIpcmCbSizeY ) | |
|   pcm_flag[ x0 ][ y0 ] | ae(v) |
|   if( pcm_flag[ x0 ][ y0 ] ) { | |
|   while( !byte_aligned( ) ) | |
|     pcm_alignment_zero_bit | f(1) |
|   pcm_sample( cbWidth, cbHeight, treeType) | |
|   } else { | |
|   if( treeType = = SINGLE_TREE | | treeType = = DUAL_TREE_LUMA ) { | |
|     if( ( y0 % CtbSizeY ) > 0 ) | |
|       intra_luma_ref idx[ x0 ][ y0 ] | ae(v) |
|     if (intra_luma_ref idx[ x0 ][ y0 ] = = 0 && | |
|     ( cbWidth <= MaxTbSizeY | | cbHeight <= MaxTbSizeY) && | |
|     ( cbWidth * cbHeight > MinTbSizeY * MinTbSizeY )) | |
|     intra_subpartitions_mode_flag[ x0 ][ y0 ] | ae(v) |
|     if( intra_subpartitions_mode_flag[ x0 ][ y0 ] = = 1 && | |
|       cbWidth <= MaxTbSizeY && cbHeight <= MaxTbSizeY ) | |
|     intra_subpartitions_split_flag[ x0 ][ y0 ] | ae(v) |
|       if( intra_luma_ref_idx[ x0 ][ y0 ] == 0 && | |
|       intra_subpartitions_mode_flag[ x0 ][ y0 ] == 0 ) | |
|       intra_luma_mpm_flag[ x0 ][ y0 ] | ae(v) |
|     if( intra_luma_mpm_flag[ x0 ][ y0 ] ) | |
|       intra_luma_mpm_idx[ x0 ][ y0 ] | ae(v) |
|     else | |
|       intra_luma_mpm_remainder[ x0 ][ y0 ] | ae(v) |
|     } | |
|   } | |
|   if( treeType = = SINGLE_TREE | | treeType = = DUAL_TREE_CHROMA ) | |
|     intra_chroma_pred_mode[ x0 ][ y0 ] | ae(v) |
|   } | |
| } else if( treeType != DUAL_TREE_CHROMA ) { /* MODE_INTER or MODE_IBC */ | |
|   ... | |
| } | | bdpcm_flag[x0][y0] equal to 1 specifies that a bdpcm_dir_flag is present in the coding unit including the luma coding block at the location (x0, y0)

bdpcm_dir_flag[x0][y0] equal to 0 specifies that the prediction direction to be used in a bdpcm block is horizontal, otherwise it is vertical.

2.9 Partition Structure

2.9.1 Partitioning of the CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can he further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 6:
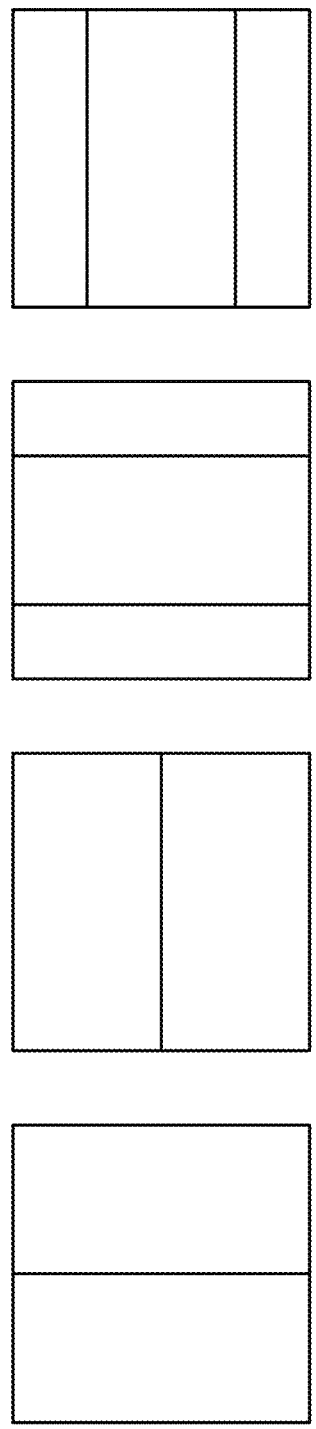
FIG. 6 shows an example of multi-type tree splitting modes.

In VVC, a quadtree with nested multi-type tree using binary and ternary splits segmentation structure replaces the concepts of multiple partition unit types, i.e., it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 6, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU. In addition, luma and chroma components have separate partition structures on I tiles.

2.10 Cross-Component Linear Model Prediction

Figure 7:
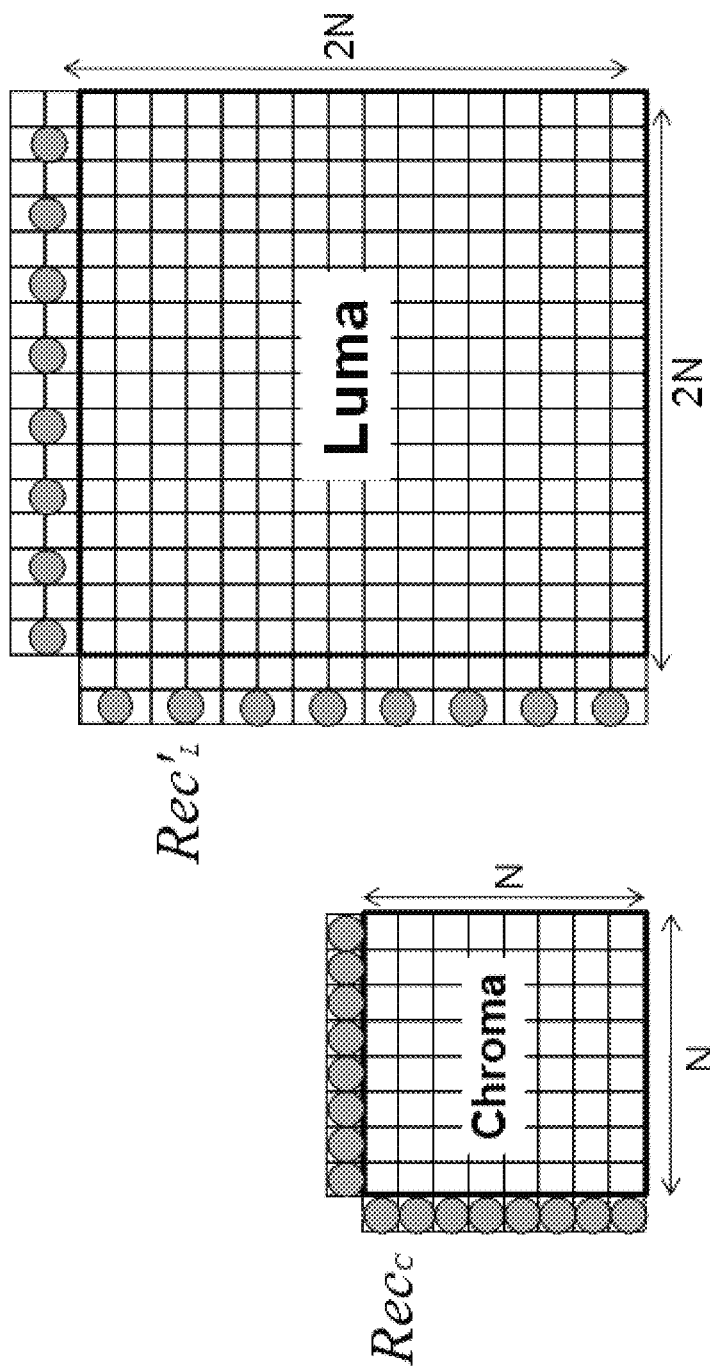
FIG. 7 shows an example of samples used to derive parameters in a cross-component linear model (CCLM) prediction mode.

To reduce the cross-component redundancy, a cross-component linear model (CCLM) prediction mode is used in the VTM4, for which the chroma samples are predicted based on the reconstructed luma samples of the same CU by using a linear model as follows:

$$pred_C(i,j) = \alpha \cdot rec_L'(i,j) + \beta$$

where $pred_C(i,j)$ represents the predicted chroma samples in a CU and $rec_L(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. The linear model parameters $\alpha$ and $\beta$ are obtained according to the following equations.

$$\alpha = \frac{Y_a - Y_b}{X_a - X_b}$$

$$\beta = Y_b - \alpha \cdot X_b$$

Where $Y_a$ and $X_a$ represent luma value and chroma value of the luma sample with maximum luma sample value. And $X_b$ and $Y_b$ represent luma value and chroma value of the luma sample with minimum luma sample, respectively. FIG. 7 shows an example of the location of the left and above samples and the sample of the current block involved in the CCLM mode.

2.11 Luma Mapping with Chroma Scaling (LMCS)

Figure 8:
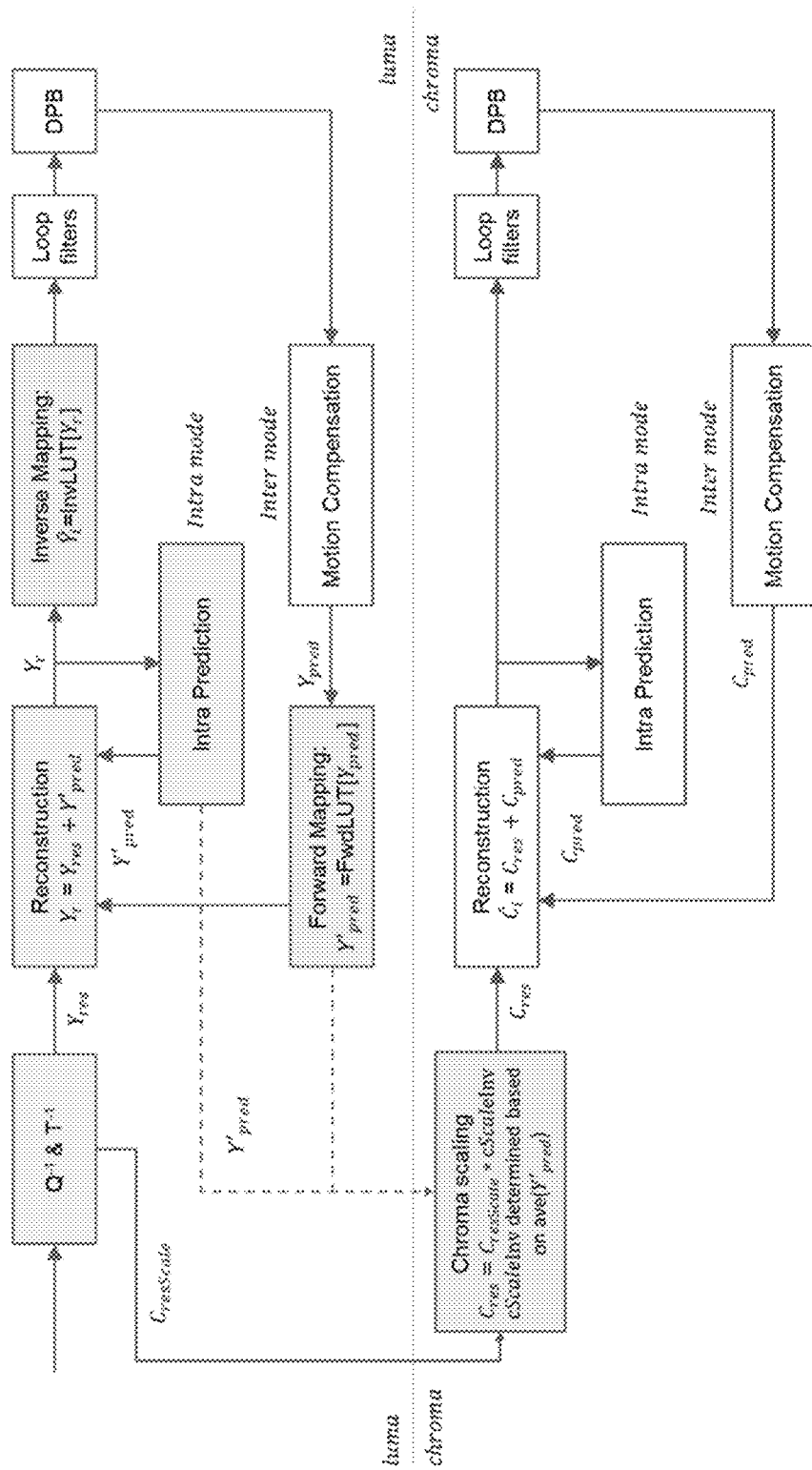
FIG. 8 shows an exemplary architecture for luma mapping with chroma scaling.

In VTM4, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 8 shows the LMCS architecture from decoder's perspective. The shaded blocks in FIG. 8 indicate where the processing is applied in the mapped domain; and these include the inverse quantization, inverse transform, luma intra prediction and adding of the luma prediction together with the luma residual. The unshaded blocks in FIG. 8 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 8 are the new LMCS functional blocks, including forward and inverse mapping of the luma signal and a luma-dependent chroma scaling process. Like most other tools in VVC, LMCS can be enabled/disabled at the sequence level using an SPS flag.

3. Examples of Problems Solved by Embodiments

Although the coefficient coding in JVET-N0280 can achieve coding benefits on screen content coding, the coefficients coding and TS mode may still have some drawbacks.
(1) The maximal allowed width or height for TS mode are controlled by one common value in PPS, which may limit the flexibility.
(2) Every coding group (CG) needs to signal a cbf flag for the TS mode which may increase the overhead cost.
(3) The coefficient scanning order does not consider the intra prediction mode.
(4) The sign flag coding only employs one context.
(5) Transform skip on the chroma component is not supported.
(6) Transform skip flag are applied on all prediction modes which increases the overhead cost and encoding complexity.

4. Examples of Embodiments

The detailed inventions below should be considered as examples to explain general concepts. These inventions should not be interpreted in a narrow way. Furthermore, these inventions can be combined in any manner.

1. Indications of the maximal allowed width and height for transform skip may be both signaled in the SPS/VPS/PPS/picture header/slice header/tile group header/LCU row/group of LCUs.
   a. In one example, the maximal allowed width and height for transform skip may be indicated by different messages signaled in the SPS/VPS/PPS/picture header/slice header/tile group header/LCU row/group of LCUs.
   b. In one example, the maximal allowed width and/or height may be first signaled in the SPS/PPS, then updated in the picture header/slice header/tile group header/LCU row/group of LCUs.
2. A TS coded block may be divided into several coefficient groups (CGs) and signaling of the coded block flag (Cbf) flags of at least one CG may be skipped.
   a. In one example, signaling of all CGs' Cbf flags may be skipped, e.g., for a TS coded blocks.
   b. In one example, the skipped cbf flags of CGs may be inferred to 1 for the TS mode
   c. In one example, whether to skip partial or all Cbf flags of CGs may depend on the coded mode.
      i. In one example, for TS-coded intra blocks, signalling of all Cbf flags of CGs is skipped.
   d. In one example, the skipped Cbf flag of a CG may be inferred based on
      i. A message signalled in the SPS/VPS/PPS/picture header/slice header/tile group header/LCU row/group of LCUs/LCU/CU
      ii. The position of the CG
      iii. Block dimension of current block and/or its neighboring blocks
      iv. Block shape of current block and/or its neighboring blocks
      v. The most probable modes of the current block and/or its neighboring blocks
      vi. Prediction modes (Intra/Inter) of the neighboring blocks of the current block
      vii. Intra prediction modes of the neighboring blocks of the current block
      viii. Motion vectors of the neighboring blocks of the current block
      ix. The indication of QR-BDPCM modes of the neighboring block of the current block
      x. Current quantization parameter of current block and/or that of its neighboring blocks
      xi. Indication of the color format (such as 4:2:0, 4:4:4)
      xii. Single/dual coding tree structure
      xiii. Slice/tile group type and/or picture type
3. The coefficient scanning order in TS coded blocks may be dependent on a message signalled in the SPS/VPS/PPS/picture header/slice header/tile group header/LCU row/group of LCUs/LCU/CU.
   a. Alternatively, the CG and/or coefficient scanning order may be dependent on intra prediction mode when TS is employed
      i. In one example, the scanning order may be vertical if the intra prediction mode is horizontally dominated
         1. In one example, the scanning order may be vertical if the intra prediction mode index ranges from 2 to 34.
         2. In one example, the scanning order may be vertical if the intra prediction mode index ranges from 2 to 33.
      ii. In one example, the scanning order may be vertical if the intra prediction mode is vertically dominated
         1. In one example, the scanning order may be vertical if the intra prediction mode index ranges from 34-66.
         2. In one example, the scanning order may be vertical if the intra prediction mode index ranges from 35-66.
      iii. In one example, the scanning order may be horizontal if the intra prediction mode is vertically dominated
         1. In one example, the scanning order may be vertical if the intra prediction mode index ranges from 34 to 66.
         2. In one example, the scanning order may be vertical if the intra prediction mode index ranges from 35 to 66.
      iv. In one example, the scanning order may be horizontal if the intra prediction mode is horizontally dominated
         1. In one example, the scanning order may be vertical if the intra prediction mode index ranges from 2 to 34.
         2. In one example, the scanning order may be vertical if the intra prediction mode index ranges from 2 to 33.
4. It is proposed the context of sign flag coding may depend on neighboring information in a coefficient block for TS mode.
   a. In one example, the context of coding the current sign flag may depend on the value of neighboring sign flags for TS mode.
      i. In one example, the context of coding the current sign flag may depend on the value of sign flags of left and/or above neighbors.
         1. In one example, the context of the current sign flag may be derived as C=(L+A), where the C is the context id, L is the sign flag of its left neighbor and A is the sign flag of its above neighbor
         2. In one example, the context of the current sign flag may be derived as C=(L+A*2), where the C is the context id, L is the sign flag of its left neighbor and A is the sign flag of its above neighbor
         3. In one example, the context of the current sign flag may be derived as C=(L*2+A), where the C is the context id, L is the sign flag of its left neighbor and A is the sign flag of its above neighbor
      ii. In one example, the context of coding the current sign flag may depend on the value of sign flags of left, above neighbors, and above left neighbor.
      iii. In one example, the context of coding the current sign flag may depend on the value of sign flags of left, above neighbors, above left neighbor, above right neighbor.
   b. In one example, the context of coding the current sign flag may depend on the position of the coefficient.
      i. In one example, the context of sign flag may be different at different positions.

ii. In one example, the context of sign flag may depend on x+y, where x and y are horizontal and vertical position of a position.
iii. In one example, the context of sign flag may depend on min(x,y), where x and y are horizontal and vertical position of a position.
iv. In one example, the context of sign flag may depend on max(x,y), where x and y are horizontal and vertical position of a position.

5. It is proposed the chroma transform skip mode may be supported.
   a. In one example, usage of the chroma transform skip mode may be based on a message signalled in the SPS/VPS/PPS/picture header/slice header/tile group header/LCU row/group of LCUs/LCU/CU/video data unit.
   b. Alternatively, usage of the chroma transform skip mode may be based on the decoded information of one or multiple representative previously coded blocks in the same color component or other color components.
      i. In one example, the indication of chroma TS flag may be inferred to false if the indication of the TS flag of a representative block is false. Alternatively, the indication of chroma TS flag may be inferred to true if the indication of the TS flag of the representative block is true.
      ii. In one example, the representative block may be a luma block or a chroma block.
      iii. In one example, the representative block could be any block within the collocated luma block.
      iv. In one example, the representative block could be one of neighboring chroma blocks of the current chroma block.
      v. In one example, the representative block may be the block covering the corresponding luma sample of the center chroma sample within current chroma block.
      vi. In one example, the representative block may be the block covering the corresponding luma sample of the right bottom chroma sample within current chroma block.

6. Whether and/or how to apply the transform skip mode may depends on a message signaled in the SPS/VPS/PPS/picture header/slice header/tile group header/LCU row/group of LCUs/LCU/CU/video data unit.
   a. In one example, the indication of when to and/or how to apply transform skip mode may depend on
      i. Block dimension of current block and/or its neighboring blocks
      ii. Block shape of current block and/or its neighboring blocks
      iii. The most probable modes of the current block and/or its neighboring blocks
      iv. Prediction modes (Intra/Inter) of the neighboring blocks of the current block
      v. Intra prediction modes of the neighboring blocks of the current block
      vi. Motion vectors of the neighboring blocks of the current block
      vii. The indication of QR-BDPCM modes of the neighboring block of the current block
      viii. Current quantization parameter of current block and/or that of its neighboring blocks
      ix. Indication of the color format (such as 4:2:0, 4:4:4)
      x. Single/dual coding tree structure
      xi. Slice/tile group type and/or picture type
      xii. Temporal layer ID
   b. In one example, transform skip mode may be applied when the prediction mode is an IBC mode and the block width and/or height is smaller/bigger/equal to a threshold
      i. In one example, the threshold may be 4, 8, 16 or 32.
      ii. In one example, the threshold may be signaled in the bitstream.
      iii. In one example, the threshold may be based on
         1. a message signaled in the SPS/VPS/PPS/picture header/slice header/tile group header/LCU row/group of LCUs/LCU/CU
         2. Block dimension of current block and/or its neighboring blocks
         3. Block shape of current block and/or its neighboring blocks
         4. The most probable modes of the current block and/or its neighboring blocks
         5. Prediction modes (Intra/Inter) of the neighboring blocks of the current block
         6. Intra prediction modes of the neighboring blocks of the current block
         7. Motion vectors of the neighboring blocks of the current block
         8. The indication of QR-BDPCM modes of the neighboring block of the current block
         9. Current quantization parameter of current block and/or that of its neighboring blocks
         10. Indication of the color format (such as 4:2:0, 4:4:4)
         11. Single/dual coding tree structure
         12. Slice/tile group type and/or picture type
         13. Temporal layer ID 7. Whether to signal the indication of TS mode may depend on the decoded/derived intra prediction mode.
   a. Alternatively, furthermore, it may depend on the allowed intra prediction modes/directions used in QR-BDPCM coded blocks and usage of QR-BDPCM.
   b. For a decoded or derived intra prediction mode, if it is part of allowed sets of intra prediction modes/directions used in QR-BDPCM coded blocks, the signaling of TS flag may be skipped.
      i. In one example, if QR-BDPCM is allowed for coding one slice/picture/tile/brick, vertical and horizontal modes are two allowed modes in QR-BDPCM process, and the decoded/derived intra mode is vertical or horizontal mode, then the indication of TS mode is not signaled.
   c. In one example, transform skip mode may be inferred to be enabled when the indication of QR-BDPCM mode (e.g., bdpcm_flag) is 1.
   d. The above method may be applied based on
      i. a message signaled in the SPS/VPS/PPS/picture header/slice header/tile group header/LCU row/group of LCUs/LCU/CU
      ii. Block dimension of current block and/or its neighboring blocks
      iii. Block shape of current block and/or its neighboring blocks
      iv. The most probable modes of the current block and/or its neighboring blocks
      v. Prediction modes (Intra/Inter) of the neighboring blocks of the current block vi. Intra prediction modes of the neighboring blocks of the current block
vii. Motion vectors of the neighboring blocks of the current block
viii. The indication of QR-BDPCM modes of the neighboring block of the current block
ix. Current quantization parameter of current block and/or that of its neighboring blocks
x. Indication of the color format (such as 4:2:0, 4:4:4)
xi. Single/dual coding tree structure
xii. Slice/tile group type and/or picture type
xiii. Temporal layer ID 8. Whether and/or how to apply QR-BDPCM may depend on the indication of the TS mode.
   a. In one example, the indication of whether to apply QR-BDPCM may be signaled on a transform unit (TU) level instead of being signaled in CU.
      i. In one example, the indication of whether to apply QR-BDPCM may be signaled after the indication of TS mode is applied to a TU.
   b. In one example, QR-BDPCM is treated as a special case of TS mode.
      i. When one block is coded with TS mode, another flag may be further signaled to indicate whether QR-BDPCM or conventional TS mode is applied. If it is coded with QR-BDPCM, the prediction direction used in QR-BDPCM may be further signaled.
      ii. Alternatively, when one block is coded with TS mode, another flag may be further signaled to indicate which kind of QR-BDPCM (e.g., horizontal/vertical prediction direction-based QR-BDPCM) or conventional TS mode is applied.
   c. In one example, the indication of whether to QR-BDPCM may be inferred based on the indication of TS mode.
      i. In one example, the indication of whether to apply QR-BDPCM on a luma and/or chroma block may be inferred to true if the indication of whether to apply the transform skip flag on the same block is true. Alternatively, if the indication of whether to apply transform skip flag on a luma and/or chroma block is true, the indication of whether to apply QR-BDPCM on the same block may be inferred to true.
      ii. In one example, the indication of whether to apply QR-BDPCM on a luma and/or chroma block may be inferred to false if the indication of whether to apply the transform skip flag on the same block is false. Alternatively, if the indication of whether to apply the transform skip flag on a luma and/or chroma block is false, the indication of whether to apply QR-BDPCM on the same block may be inferred to false.

9. Whether and/or how to apply a single/dual tree may depend on a message signaled in the SPS/VPS/PPS/picture header/slice header/tile group header/LCU row/group of LCUs/LCU/CU/video data unit.
   a. In one example, the indication of whether to apply a single/dual tree may depend whether the current slice/tile/LCU/LCU row/group of LCUs/video data unit is determined as screen contents.
      i. Furthermore, in one example, whether a slice/tile/LCU/LCU row/group of LCUs/video data unit is determined as screen contents may depend on
         1. a message/flag signaled in the SPS/VPS/PPS/picture header/slice header/tile group header/LCU row/group of LCUs/LCU/CU/video data unit.
         2. Block dimension of current CTU and/or its neighboring CTUs
         3. Block shape of current CTU and/or its neighboring CTUs
         4. Current quantization parameter of current CTU and/or that of its neighboring CTUs
         5. Indication of the color format (such as 4:2:0, 4:4:4)
         6. Single/dual coding tree structure type of the previous slice/tile/LCU/LCU row/group of LCUs/video data unit
         7. Slice/tile group type and/or picture type
         8. Temporal layer ID
   b. In one example, the indication of whether to apply a single/dual tree may be inferred, which may depend on
      i. a message signaled in the SPS/VPS/PPS/picture header/slice header/tile group header/LCU row/group of LCUs/LCU/CU/video data unit.
      ii. The hash hit ratio of IBC/Inter modes in previous coded pictures/tile/slices/reconstructed region
      iii. Block dimension of current CTU and/or its neighboring CTUs
      iv. Block shape of current CTU and/or its neighboring CTUs
      v. Current quantization parameter of current CTU and/or that of its neighboring CTUs
      vi. Indication of the color format (such as 4:2:0, 4:4:4)
      vii. Single/dual coding tree structure type of the previous slice/tile/LCU/LCU row/group of LCUs/video data unit
      viii. Slice/tile group type and/or picture type
      ix. Temporal layer ID
   c. In one example, the indication of whether to apply CCLM and/or LMCS may depend on single/dual coding tree structure type
      i. In one example, the indication CCLM and/or LMCS may be inferred to false when a single/dual tree is used.
   d. In one example, the indication of whether to apply single/dual tree (i.e., CTU-level adaptation of single tree or dual tree) may depends whether the indication of enabling dual tree (e.g., qtbtt_dual_tree_intra_flag) is true.
      i. Alternatively, furthermore, if the dual tree for a sequence/slice/tile/brick is not enabled (e.g., qtbtt_dual_tree_intra_flag is false), the indication of whether to apply single/dual tree in a lower level (e.g., CTU) may be inferred to false 1. Alternatively, if the dual tree is enabled (e.g., qtbtt_dual_tree_intra_flag is true), the indication of whether to apply single/dual tree for a video unit smaller than sequence/slice/tile/brick may be signaled.
   e. In one example, the indication of whether to apply single/dual tree (i.e., CTU-level adaptation of single tree or dual tree) may depends whether a flag at a level higher than CTU level (e.g., sps_asdt_flag and/or slice_asdt_flag) is true.
      i. Alternatively, furthermore, if a flag at a level higher than CTU level (e.g., sps_asdt_flag and/or slice_asdt_flag) is false, the indication of whether to apply single/dual tree (i.e., CTU-level adaptation of single tree or dual tree) may be inferred to false.
f. The above methods may be also applicable to single tree partition case, or single/dual coding tree structure type.
10. Whether to enable IBC may depend on the coding tree structure type.
   a. In one example, for a given coding tree structure type (e.g., dual tree), the signaling of indication of IBC mode and/or block vectors used in IBC mode may be skipped and inferred.
   b. In one example, the indication of the IBC mode may be inferred to false when dual coding tree structure type is applied.
   c. In one example, the indication of the IBC mode of a luma block may be inferred to false when dual coding tree structure type is applied.
   d. In one example, the indication of the IBC mode of a chroma block may be inferred to false when dual coding tree structure type is applied.
   e. In one example, the indication of the IBC mode may be inferred based on
      i. a message signaled in the SPS/VPS/PPS/picture header/slice header/tile group header/LCU row/group of LCUs/LCU/CU/video data unit.
      ii. The hash hit ratio of IBC/Inter modes in previous coded pictures/tile/slices/reconstructed region
      iii. Block dimension of current CTU and/or its neighboring CTUs
      iv. Block shape of current CTU and/or its neighboring CTUs
      v. Current quantization parameter of current CTU and/or that of its neighboring CTUs
      vi. Indication of the color format (such as 4:2:0, 4:4:4)
      vii. Coding tree structure type of the previous slice/tile/LCU/LCU row/group of LCUs/video data unit
      viii. Slice/tile group type and/or picture type
      ix. Temporal layer ID
11. Whether to enable CCLM may depend on the coding tree structure type.
   a. In one example, for a given coding tree structure type (e.g., dual tree), the signaling of indication of CCLM mode, and/or other syntax related to CCLM mode, may be skipped and inferred.
   b. In one example, the indication of the CCLM mode may be inferred to false when dual coding tree structure type is applied.
   c. In one example, the indication of the CCLM mode, when dual coding tree structure type is applied, may be inferred based on
      i. a message signaled in the SPS/VPS/PPS/picture header/slice header/tile group header/LCU row/group of LCUs/LCU/CU/video data unit.
      ii. The hash hit ratio of IBC/Inter modes in previous coded pictures/tile/slices/reconstructed region
      iii. Block dimension of current CTU and/or its neighboring CTUs
      iv. Block shape of current CTU and/or its neighboring CTUs
      v. Current quantization parameter of current CTU and/or that of its neighboring CTUs
      vi. Indication of the color format (such as 4:2:0, 4:4:4)
      vii. Coding tree structure type of the previous slice/tile/LCU/LCU row/group of LCUs/video data unit
      viii. Slice/tile group type and/or picture type
      ix. Temporal layer ID
12. Whether to enable LMCS for chroma components may depend on the coding tree structure type.
   a. In one example, for a given coding tree structure type (e.g., dual tree), the signaling of indication of LMCS for chroma components, and/or other syntax related to LMCS mode, may be skipped and inferred.
   b. In one example, the indication of the LMCS for chroma components may be inferred to false when dual coding tree structure type is applied.
   c. In one example, the indication of the LMCS for chroma components, when dual coding tree structure type is applied, may be inferred based on
      i. a message signaled in the SPS/VPS/PPS/picture header/slice header/tile group header/LCU row/group of LCUs/LCU/CU/video data unit.
      ii. The hash hit ratio of IBC/Inter modes in previous coded pictures/tile/slices/reconstructed region
      iii. Block dimension of current CTU and/or its neighboring CTUs
      iv. Block shape of current CTU and/or its neighboring CTUs
      v. Current quantization parameter of current CTU and/or that of its neighboring CTUs
      vi. Indication of the color format (such as 4:2:0, 4:4:4)
      vii. Coding tree structure type of the previous slice/tile/LCU/LCU row/group of LCUs/video data unit
      viii. Slice/tile group type and/or picture type
      ix. Temporal layer ID
13. Coding tree structure may depend on whether IBC is used or not.
   a. In one example, the dual tree structure and the IBC method may be not enabled concurrently at a sequence/picture/tile/brick/CTUNPDU/32×32 block/64×32 block/32×64 block level.
   b. Alternatively, furthermore, in one example, if IBC method is enabled, the dual tree structure may be disabled at a sequence/picture/tile/brick/CTUNPDU/32×32 block/64×32 block/32×64 block level.
   c. In one example, when IBC is used in a region, chroma coding tree structure may be aligned to luma coding tree structure
      i. In one example, the region may be a sequence/picture/tile/brick/CTUNPDU/32×32 block/64×32 block/32×64 block.
      ii. In one example, when a collocated luma block is split into subblocks, the chroma block may be split into subblocks if it is allowed to be split.
      iii. In one example, whether and how a chroma block is split may be inferred from the coding structure of its collocated luma block.
      iv. In one example, when chroma coding tree structure is inferred from luma coding tree structure, the signals to code the chroma coding tree structure may be skipped.
      v. In one example, a flag may be used to indicate whether chroma coding structure can be inferred from luma coding structure or not. Signaling of the flag may depend on
         1. A message signaled in the SPSNPS/PPS/picture header/slice header/tile group header/LCU row/group of LCUs/LCU/CU/video data unit.
         2. The hash hit ratio of IBC/Inter modes in previous coded pictures/tile/slices/reconstructed region 3. Block dimension of current CTU and/or its neighboring CTUs
4. Block shape of current CTU and/or its neighboring CTUs
5. Current quantization parameter of current CTU and/or that of its neighboring CTUs
6. Indication of the color format (such as 4:2:0, 4:4:4)
7. Coding tree structure type of the previous slice/tile/LCU/LCU row/group of LCUs/video data unit
8. Slice/tile group type and/or picture type
9. Temporal layer ID 14. Whether to enable palette coding mode may depend on the coding tree structure type.
   a. In one example, for a given coding tree structure type (e.g., dual tree), the signaling of indication of palette coding mode may be skipped and inferred.
   b. In one example, the indication of the palette coding mode may be inferred to false when dual coding tree structure type is applied.
   c. In one example, the indication of the palette coding mode of a luma block may be inferred to false when dual coding tree structure type is applied.
   d. In one example, the indication of the palette coding mode of a chroma block may be inferred to false when dual coding tree structure type is applied.
   e. In one example, the indication of the palette coding mode inferred may be based on
      i. a message signaled in the SPS/VPS/PPS/picture header/slice header/tile group header/LCU row/group of LCUs/LCU/CU/video data unit.
      ii. The hash hit ratio of IBC/Inter modes in previous coded pictures/tile/slices/reconstructed region
      iii. Block dimension of current CTU and/or its neighboring CTUs
      iv. Block shape of current CTU and/or its neighboring CTUs
      v. Current quantization parameter of current CTU and/or that of its neighboring CTUs
      vi. Indication of the color format (such as 4:2:0, 4:4:4)
      vii. Coding tree structure type of the previous slice/tile/LCU/LCU row/group of LCUs/video data unit
      viii. Slice/tile group type and/or picture type
      ix. Temporal layer ID 15. Coding tree structure may depend on whether palette coding mode is used or not.
   a. In one example, when palette coding mode is used in a region, chroma coding tree structure may be aligned to luma coding tree structure
      i. In one example, the region may be a sequence/picture/tile/brick/CTU/VPDU/32×32 block/64×32 block
      ii. In one example, when a collocated luma block is split into subblocks, the chroma block may be split into subblocks if it is allowed to be split.
      iii. In one example, whether and how a chroma block is split may be inferred from the coding structure of its collocated luma block.
      iv. In one example, when chroma coding tree structure is inferred from luma coding tree structure, the signals to code the chroma coding tree structure may be skipped.
      v. In one example, a flag may be used to indicate whether chroma coding structure can be inferred from luma coding structure or not. Signaling of the flag may depend on
         1. A message signaled in the SPS/VPS/PPS/picture header/slice header/tile group header/LCU row/group of LCUs/LCU/CU/video data unit.
         2. The hash hit ratio of IBC/Inter modes in previous coded pictures/tile/slices/reconstructed region
         3. Block dimension of current CTU and/or its neighboring CTUs
         4. Block shape of current CTU and/or its neighboring CTUs
         5. Current quantization parameter of current CTU and/or that of its neighboring CTUs
         6. Indication of the color format (such as 4:2:0, 4:4:4)
         7. Coding tree structure type of the previous slice/tile/LCU/LCU row/group of LCUs/video data unit
         8. Slice/tile group type and/or picture type
         9. Temporal layer ID 16. The motion/block vector of a sub-block/sample in a chroma IBC coded block may be derived from the first available IBC-coded sub-region within the collocated luma block.
   a. In one example, a scanning order of sub-regions within the collocated luma block may be defined, such as raster scanning order.
   b. In one example, a sub-region may be defined as the minimum coding unit/minimum transform unit.
   c. In one example, the motion/block vector of whole samples in a chroma IBC mode may be derived based on the motion vector of the most top-left sample coded in an IBC or inter mode in the collocated luma block.

17. A motion/block vector may be signaled in the chroma IBC mode.
   a. In one example, the difference between a motion vector and a motion vector predictor may be signaled.
      i. In one example, the motion vector predictor may be derived based on the motion vectors of a collocated luma block, neighboring luma blocks of the collocated luma block, neighboring chroma blocks of current chroma block.
         1. In one example, the motion/block vector predictor may be derived based on the motion vector of the top-left sample in the collocated luma block.
         2. In one example, the motion/block vector predictor may be derived based on the motion vector of the sample with a center position in the collocated luma block.
         3. In one example, the motion/block vector predictor may be derived based on the motion vector of the most top-left sample with coded in an IBC or inter mode in the collocated luma block.
      ii. In one example, the motion vector predictor associated one sub-region of luma component may be scaled before being used as a predictor.
      iii. In one example, the block vector may be derived from motion vectors/blocks vectors of neighboring (adjacent or non-adjacent) chroma blocks.

b. In one example, a block vector candidate list may be constructed and an index to the list may be signaled.
  i. In one example, the candidate list may include motion vectors/block vectors from collocated luma blocks, neighboring luma blocks of the collocated luma blocks, neighboring chroma blocks.
c. In one example, the indication of AMVR flag may be inferred
  i. In one example, the indication of AMVR flag may be inferred to false (0) in a block coded in the chroma IBC mode
  ii. In one example, the indication of motion vector difference may be inferred to integer precision in a block coded in the chroma IBC mode
d. In one example, a separate HMVP table may be used on the chroma IBC mode.
  i. In one example, the size of chroma HMVP table and luma HMVP table may be different.
e. In one example, whether to signal a block/motion vector in the chroma IBC mode may be based on
  i. Whether all sub-regions within the collocated luma block are coded with IBC mode.
    1. If yes, no need to signal the chroma block' block vector. Otherwise, chroma block' block vectors may be signaled.
  ii. Whether all sub-regions within the collocated luma block are coded with IBC mode and all of the associated block vectors are valid.
    1. If yes, no need to signal the chroma block' block vector. Otherwise, chroma block' block vectors may be signaled.
  iii. a message signaled in the SPS/VPS/PPS/picture header/slice header/tile group header/LCU row/group of LCUs/LCU/CU/video data unit.
  iv. The hash hit ratio of IBC/Inter modes in previous coded pictures/tile/slices/reconstructed region
  v. Block dimension of current CTU and/or its neighboring CTUs
  vi. Block shape of current CTU and/or its neighboring CTUs
  vii. Current quantization parameter of current CTU and/or that of its neighboring CTUs
  viii. Indication of the color format (such as 4:2:0, 4:4:4)
  ix. Coding tree structure type of the previous slice/tile/LCU/LCU row/group of LCUs/video data unit
  x. Slice/tile group type and/or picture type
  xi. Temporal layer ID
18. Single tree and separate/dual tree selection/signaling may be on the level below CTU/CTB
  a. In one example, single tree and separate/dual tree selection/signaling may be on VPDU level.
  b. In one example, single tree and separate/dual tree selection/signaling may be on a level where explicit partitioning tree signaling starts.

The examples described above may be incorporated in the context of the methods described below, e.g., methods 900, 910, 920, 930 and 940, which may be implemented at a video decoder or a video encoder.

An exemplary method for video processing includes performing a conversion between a current video block and a bitstream representation of a video comprising the current video block, wherein the conversion selectively uses a transform skip mode for the conversion based on an indicator that is included in the bitstream representation, and wherein, using the transform skip mode, a residual of a prediction error of the current video block is represented in the bitstream representation without applying a transformation.

In some embodiments, the indicator is a maximal allowed width and a maximal allowed height for the transform skip mode.

In some embodiments, the maximal allowed width and height is signaled in a sequence parameter set (SPS), a video parameter set (VPS), a picture parameter set (PPS), a picture header, a slice header, a tile group header, a largest coding unit (LCU) row or a group of LCUs.

In some embodiments, the maximal allowed width and height is signaled in different messages.

In some embodiments, the maximal allowed width and height is signaled in a sequence parameter set (SPS) or a picture parameter set (PPS), and wherein an updated value of the maximal allowed width and height is signaled in a picture header, a slice header, a tile group header, a largest coding unit (LCU) row or a group of LCUs.

Figure 9A:
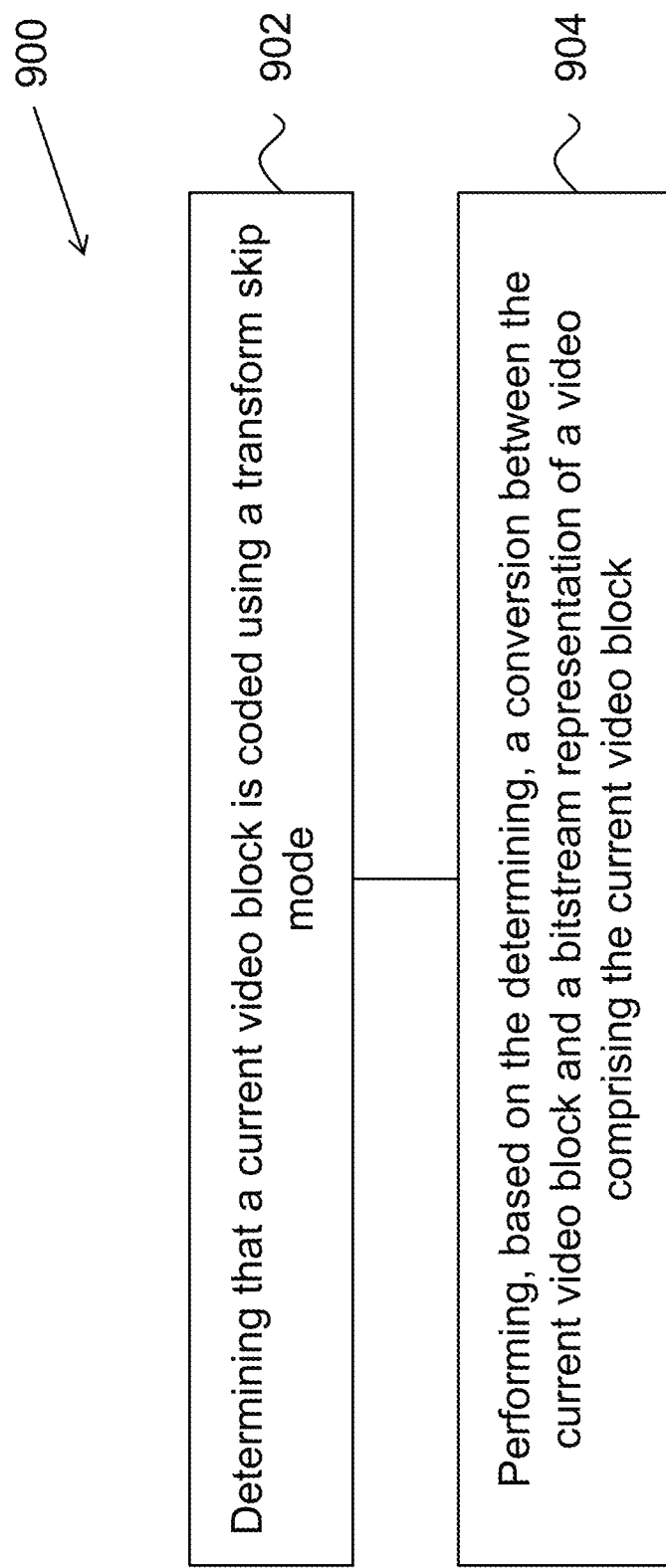
FIGS. 9A-9E are flowcharts for examples of a video processing methods.

FIG. 9A shows a flowchart of another exemplary method for video processing. The method 900 includes, at step 902, determining that a current video block is coded using a transform skip mode.

The method 900 includes, at step 904, performing, based on the determining, a conversion between the current video block and a bitstream representation of a video comprising the current video block.

In some embodiments, the current video block is divided into a plurality of coefficient groups, and the bitstream representation omits signaling of a coded block flag for at least one of the plurality of coefficient groups. In an example, the bitstream representation omits the signaling of the coded block flag for each of the plurality of coefficient groups.

In some embodiments, the coded block flag omitted in the signaling in the bitstream representation is inferred based on one or more of the following: (1) a message signaled in a sequence parameter set (SPS), a video parameter set (VPS), a picture parameter set (PPS), a picture header, a slice header, a tile group header, a largest coding unit (LCU), an LCU row, a group of LCUs or a coding unit (CU), (2) a position of at least one of the plurality of coefficient groups, (3) a block dimension of the current video block or at least one neighboring block of the current video block, (4) a block shape of the current video block or the at least one neighboring block, (5) a most probable mode of the current video block or the at least one neighboring block, (6) a prediction mode of the at least one neighboring block, (7) an intra prediction mode of the at least one neighboring block, (8) one or more motion vectors of the at least one neighboring block, (9) an indication of a quantized residual block differential pulse-code modulation (QR-BDPCM) mode of the at least one neighboring block, (10) a current quantization parameter (QP) of the current video block or the at least one neighboring block, (11) an indication of a color format of the current video block, (12) a separate or dual coding tree structure associated with the current video block, or (13) a slice type, a tile group type or a picture type of the current video block.

In some embodiments, the current video block is divided into a plurality of coefficient groups, and the method 900 further includes the step of determining a coefficient scanning order for the plurality of coefficient groups. In an example, the coefficient scanning order is based on a message signaled in a sequence parameter set (SPS), a video parameter set (VPS), a picture parameter set (PPS), a picture header, a slice header, a tile group header, a largest coding unit (LCU), an LCU row, a group of LCUs or a coding unit (CU).

In some embodiments, the plurality of coefficient group or the coefficient scanning order is based on an intra prediction mode of the current video block. In an example, the coefficient scanning order is vertical, and wherein the intra prediction mode is horizontally dominated. In another example, the coefficient scanning order is horizontal, and wherein the intra prediction mode is horizontally dominated. For example, an index of the intra prediction mode ranges from 2 to 33 or from 2 to 34.

In some embodiments, the plurality of coefficient group or the coefficient scanning order is based on an intra prediction mode of the current video block. In an example, the coefficient scanning order is vertical, and wherein the intra prediction mode is vertically dominated. In another example, the coefficient scanning order is horizontal, and wherein the intra prediction mode is vertically dominated. For example, an index of the intra prediction mode ranges from 34 to 66 or from 35 to 66.

In some embodiments, a context of a sign flag is based on neighboring information in a coefficient block associated with the current video block. In an example, the context of the sign flag is further based on a position of a coefficient of the coefficient block. In another example, the context of the sign flag is based on (x+y), min(x, y) or max(x, y), wherein x and y are a horizontal value and a vertical value of the position of the coefficient, respectively.

Figure 9B:
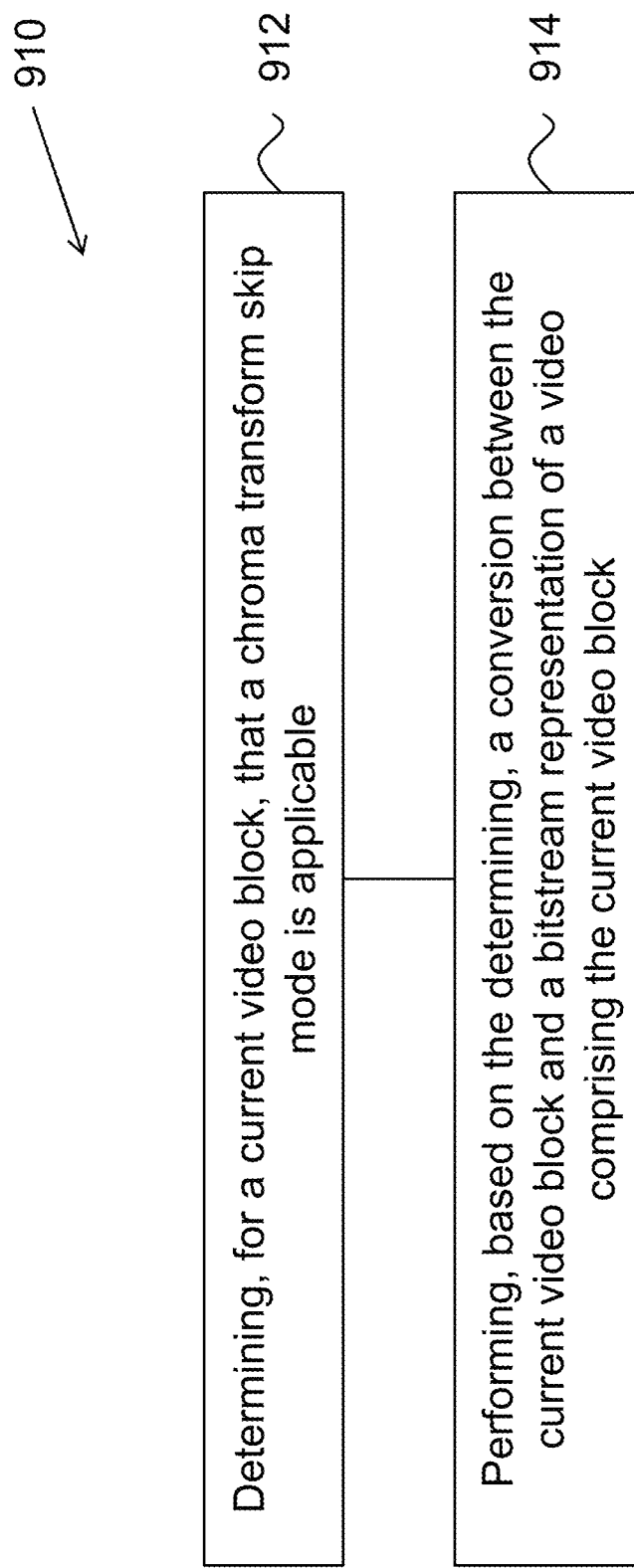

FIG. 9B shows a flowchart of yet another exemplary method for video processing. The method 910 includes, at step 912, determining, for a current video block, that a chroma transform skip mode is applicable.

The method 910 includes, at step 914, performing, based on the determining, a conversion between the current video block and a bitstream representation of a video comprising the current video block.

In some embodiments, the determining is based on a message signaled in a sequence parameter set (SPS), a video parameter set (VPS), a picture parameter set (PPS), a picture header, a slice header, a tile group header, a largest coding unit (LCU), an LCU row, a group of LCUs, a coding unit (CU) or a video data unit.

In some embodiments, the determining is based on decoded information from one or more representative video blocks that were decoded prior to the performing the conversion, and wherein a sample in each of the one or more representative video blocks and the current video block is based on a common color information. In an example, the one or more representative video blocks comprises a luma block or a chroma block. In another example, the one or more representative video blocks comprises a block within a collocated luma block.

Figure 9C:
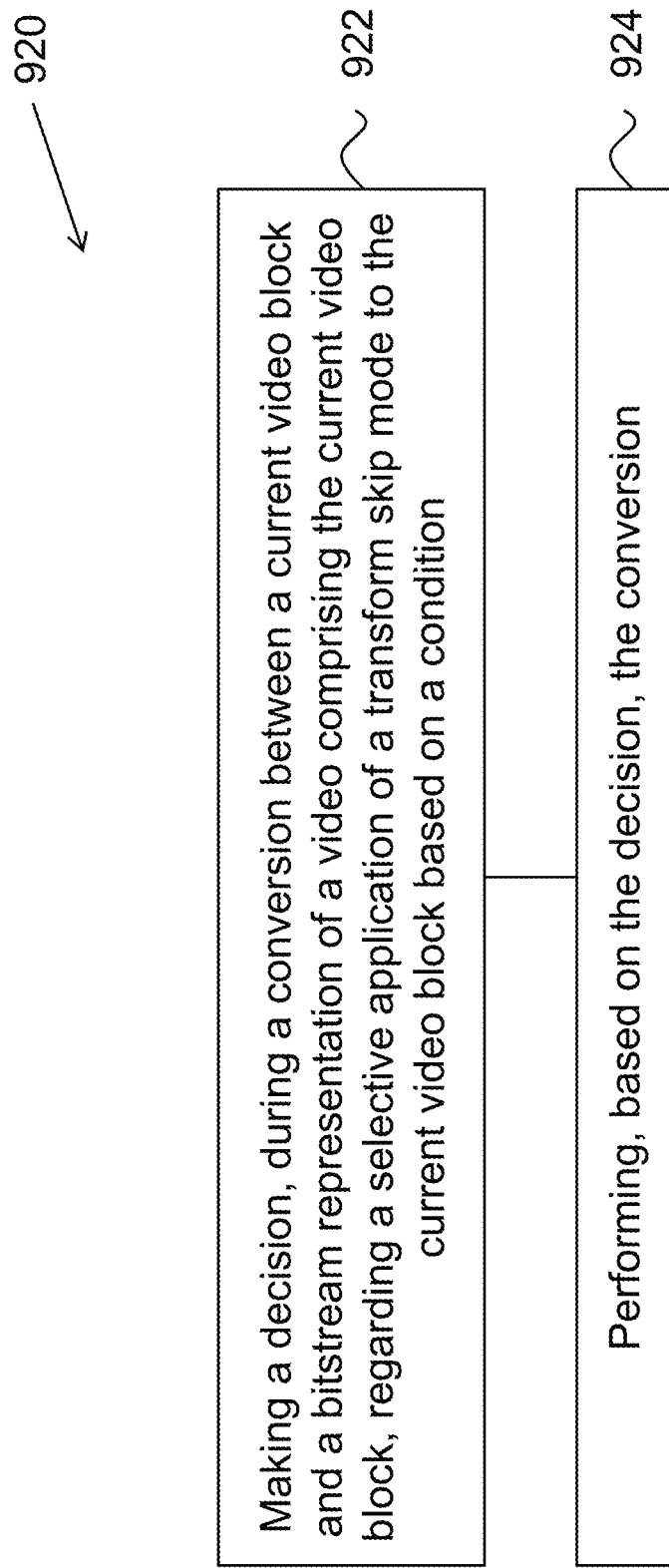

FIG. 9C shows a flowchart of yet another exemplary method for video processing. The method 920 includes, at step 922, making a decision, during a conversion between a current video block and a bitstream representation of a video comprising the current video block, regarding a selective application of a transform skip mode to the current video block based on a condition.

The method 920 includes, at step 924, performing, based on the decision, the conversion.

In some embodiments, the condition is based on a message signaled in a sequence parameter set (SPS), a video parameter set (VPS), a picture parameter set (PPS), a picture header, a slice header, a tile group header, a largest coding unit (LCU), an LCU row, a group of LCUs, a coding unit (CU) or a video data unit.

In some embodiments, the condition is based on one or more of the following: (1) a block dimension of the current video block or at least one neighboring block of the current video block, (2) a block shape of the current video block or the at least one neighboring block, (3) a most probable mode of the current video block or the at least one neighboring block, (4) a prediction mode of the at least one neighboring block, (5) an intra prediction mode of the at least one neighboring block, (6) one or more motion vectors of the at least one neighboring block, (7) an indication of a quantized residual block differential pulse-code modulation (QR-BDPCM) mode of the at least one neighboring block, (8) a current quantization parameter (QP) of the current video block or the at least one neighboring block, (9) an indication of a color format of the current video block, (10) a separate or dual coding tree structure associated with the current video block, (11) a slice type, a tile group type or a picture type of the current video block, or (12) a temporal layer identification (ID).

In some embodiments, the application of the transform skip mode is performed, a prediction mode of the current video block is an inter block copy (IBC) mode, and a width or a height of the current video block is compared to a threshold. In an example, the threshold is signaled in the bitstream representation. In another example, the threshold is 4, 8, 16 or 32.

In yet another example, the threshold is based on one or more of the following: (1) a message signaled in a sequence parameter set (SPS), a video parameter set (VPS), a picture parameter set (PPS), a picture header, a slice header, a tile group header, a largest coding unit (LCU), an LCU row, a group of LCUs or a coding unit (CU), (2) a temporal layer identification (ID), (3) a block dimension of the current video block or at least one neighboring block of the current video block, (4) a block shape of the current video block or the at least one neighboring block, (5) a most probable mode of the current video block or the at least one neighboring block, (6) a prediction mode of the at least one neighboring block, (7) an intra prediction mode of the at least one neighboring block, (8) one or more motion vectors of the at least one neighboring block, (9) an indication of a quantized residual block differential pulse-code modulation (QR-BDPCM) mode of the at least one neighboring block, (10) a current quantization parameter (QP) of the current video block or the at least one neighboring block, (11) an indication of a color format of the current video block, (12) a separate or dual coding tree structure associated with the current video block, or (13) a slice type, a tile group type or a picture type of the current video block.

Figure 9D:
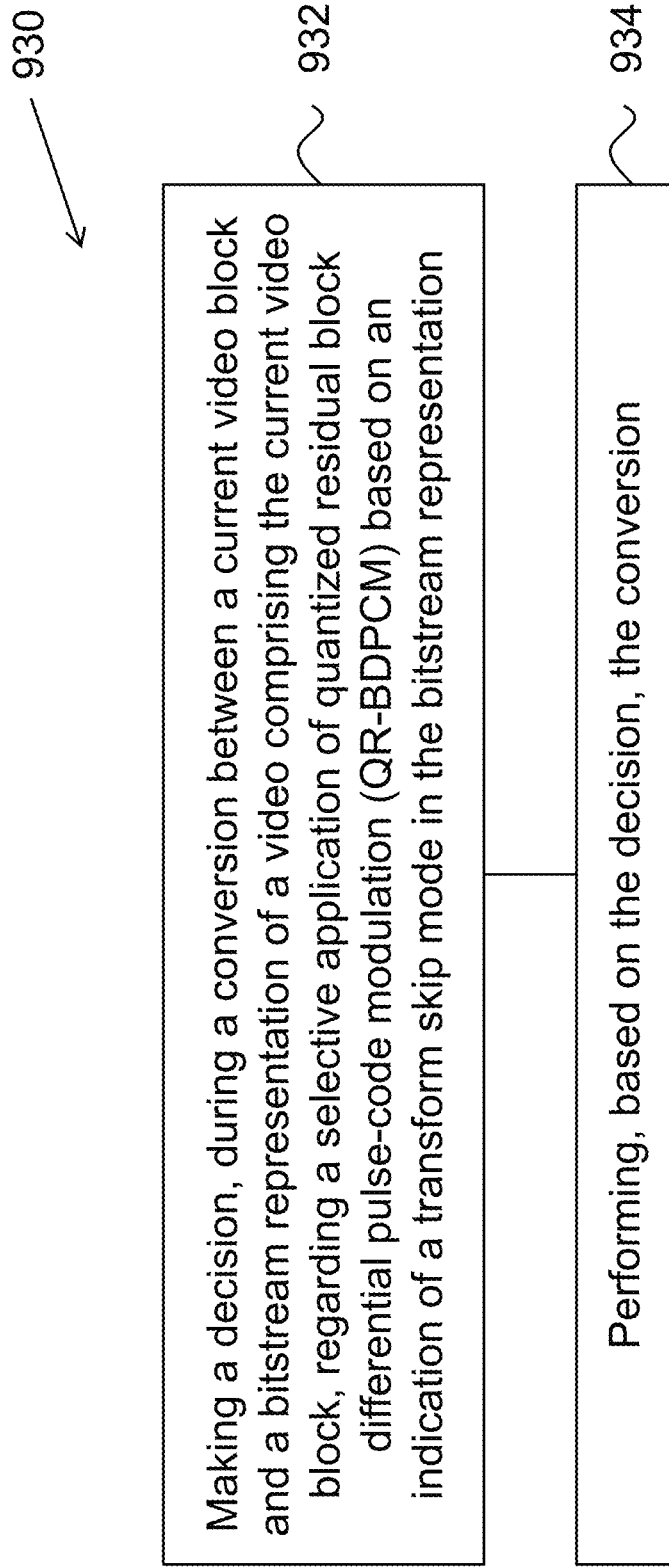

FIG. 9D shows a flowchart of yet another exemplary method for video processing. The method 930 includes, at step 932, making a decision, during a conversion between a current video block and a bitstream representation of a video comprising the current video block, regarding a selective application of quantized residual block differential pulse-code modulation (QR-BDPCM) based on an indication of a transform skip mode in the bitstream representation.

The method 930 includes, at step 934, performing, based on the decision, the conversion.

In some embodiments, the indication of the transform skip mode is signaled on a transform unit (TU) level.

Figure 9E:
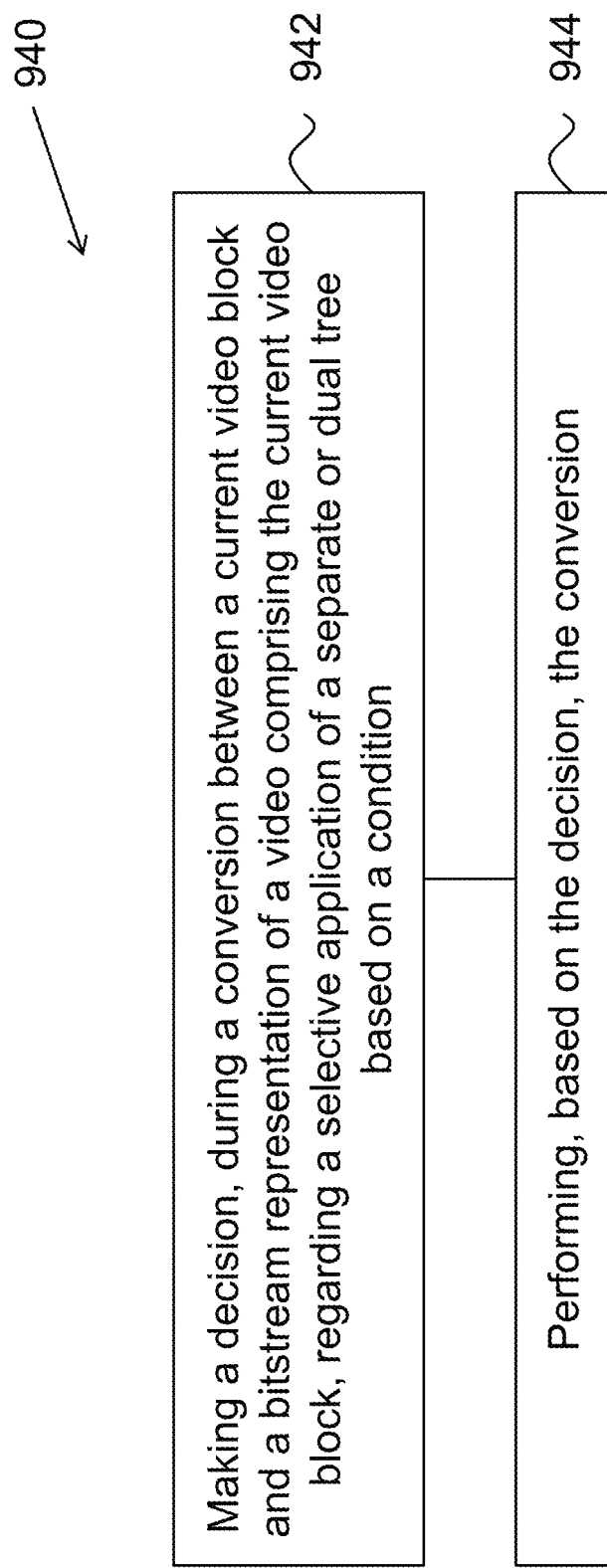

FIG. 9E shows a flowchart of yet another exemplary method for video processing. The method 940 includes, at step 942, making a decision, during a conversion between a current video block and a bitstream representation of a video comprising the current video block, regarding a selective application of a separate or dual tree based on a condition.

The method 940 includes, at step 944, performing, based on the decision, the conversion.

In some embodiments, the condition is based on a message signaled in a sequence parameter set (SPS), a video parameter set (VPS), a picture parameter set (PPS), a picture header, a slice header, a tile group header, a largest coding unit (LCU), an LCU row, a group of LCUs, a coding unit (CU) or a video data unit.

In some embodiments, the condition is based on determining whether a slice, a tile, a largest coding unit (LCU), an LCU row, a group of LCUs or a video data unit comprising the current video block is screen content. In an example, the determining is based on one or more of the following: (1) a message signaled in a sequence parameter set (SPS), a video parameter set (VPS), a picture parameter set (PPS), a picture header, a slice header, a tile group header, the LCU, the LCU row, the group of LCUs, the coding unit (CU) or the video data unit, (2) a block dimension of the current video block or at least one neighboring block of the current video block, (3) a block shape of the current video block or the at least one neighboring block, (4) a current quantization parameter (QP) of the current video block or the at least one neighboring block, (5) an indication of a color format of the current video block, (6) a separate or dual coding tree structure associated with the current video block, (7) a slice type, a tile group type or a picture type of the current video block, or (8) a temporal layer identification (ID).

Figure 10:
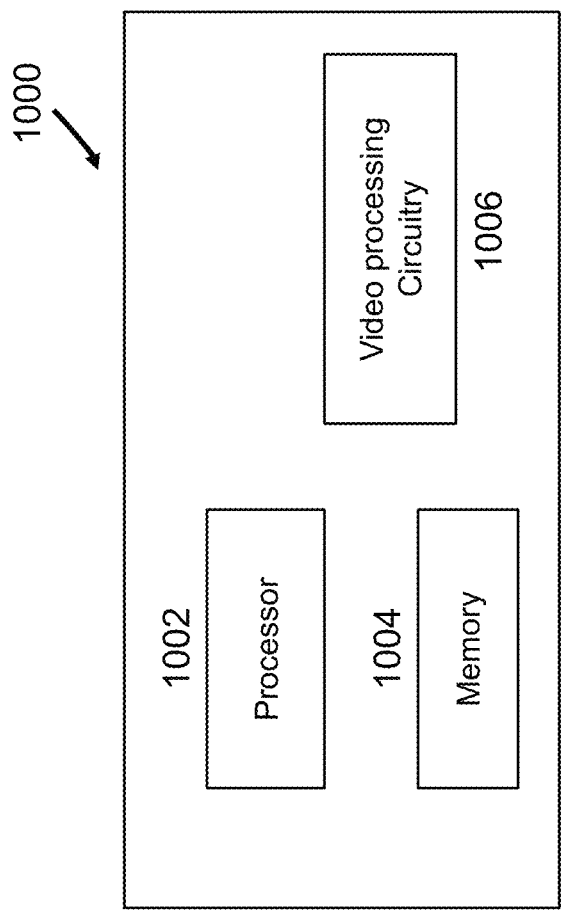
FIG. 10 is a block diagram of an example of a hardware platform for implementing a visual media decoding or a visual media encoding technique described in the present document.

FIG. 10 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods (including, but not limited to, methods 900, 910, 920, 930 and 940) described in the present document. The memory (memories) 1004 may be used for storing data and code used for implementing the methods and techniques described herein. The video processing hardware 1006 may be used to implement, in hardware circuitry, some techniques described in the present document.

In some embodiments, the video coding methods may be implemented using an apparatus that is implemented on a hardware platform as described with respect to FIG. 10.

In some embodiments, e.g., described in items 5 and 10 et seq above, a method of video processing includes making a determination about whether or not intra block copy mode is applicable for a conversion between a current video block of a video and a bitstream representation based on a type of coding tree structure corresponding to the current video block; and performing the conversion based on the determination.

In the above method, the bitstream representation excludes an indication of the intra block copy mode. In other words, the bitstream does not carry an explicit signaling of the IBC mode.

In the above method, the type of coding tree structure is a dual coding tree structure and the determination is that intra block copy mode is not applicable.

Figure 11:
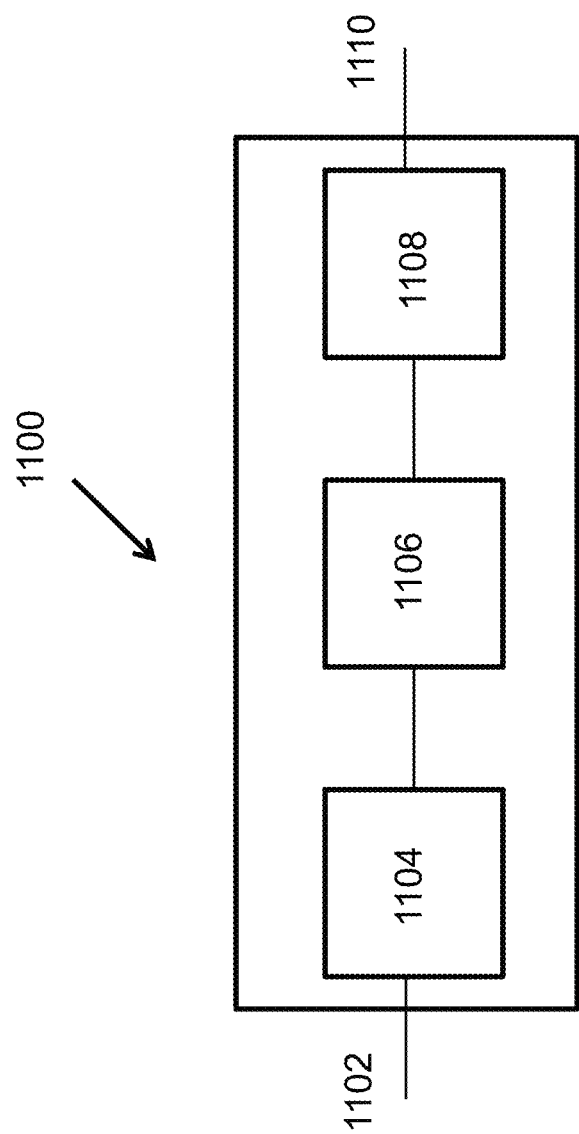
FIG. 11 is a block diagram of an example video processing system in which disclosed techniques may be implemented.

FIG. 11 is a block diagram of an example video processing system in which disclosed techniques may be implemented. Various implementations may include some or all of the components of the system 1100. The system 1100 may include input 1102 for receiving video content. The video content may be received in a raw or uncompressed format, e.g., 8 or 10 bit multi-component pixel values, or may be in a compressed or encoded format. The input 1102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1100 may include a coding component 1104 that may implement the various coding or encoding methods described in the present document. The coding component 1104 may reduce the average bitrate of video from the input 1102 to the output of the coding component 1104 to produce a coded representation of the video. The coding techniques are therefore sometimes called video compression or video transcoding techniques. The output of the coding component 1104 may be either stored, or transmitted via a communication connected, as represented by the component 1106. The stored or communicated bitstream (or coded) representation of the video received at the input 1102 may be used by the component 1108 for generating pixel values or displayable video that is sent to a display interface 1110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

FIG. 12 is a flowchart for an example for a visual media processing method. Steps of this flowchart are discussed in connection with example embodiment 7 discussed in Section 4 of this document. At step 1202, the process identifies usage of a coding mode and/or an intra prediction mode and/or a set of allowable intra prediction modes for encoding a current video block in a video region of a visual media data into a bitstream representation of the visual media data. At step 1204, the process, upon identifying the usage, makes a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

FIG. 13 is a flowchart for an example for a visual media processing method. Steps of this flowchart are discussed in connection with example embodiment 7 discussed in Section 4 of this document. At step 1302, the process identifies usage of a coding mode and/or an intra prediction mode and/or a set of allowable intra prediction modes, for decoding a current video block in a video region of visual media data from a bitstream representation of the visual media data. At step 1304, the process, upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

FIG. 14 is a flowchart for an example for a visual media processing method. Steps of this flowchart are discussed in connection with example embodiment 7 discussed in Section 4 of this document. At step 1402, the process identifies usage of a coding mode and/or an intra prediction mode and/or a set of allowable intra prediction modes for decoding a current video block in a video region of visual media data from a bitstream representation of the visual media data. At step 1404, the process, upon identifying the usage, makes a decision of whether to include or exclude, in the bitstream representation, a syntax element indicative of selectively applying a transform skip mode to the current video block, wherein, in the transform skip mode, a residual between the current video block and a prediction video block is represented in the bitstream representation of the visual media data without applying a transformation.

FIG. 15 is a flowchart for an example for a visual media processing method. Steps of this flowchart are discussed in connection with example embodiment 9d discussed in Section 4 of this document. At step 1502, the process makes a decision, for encoding a current video block in a video region of a visual media data into a bitstream representation of the visual media data, regarding a selective application of a single or dual tree coding structure based on or inferred from at least on determining that the dual tree coding structure is enabled. At step 1504, the process includes a syntax element indicative of the selective application of the single or the dual tree in the bitstream representation.

Figure 16:
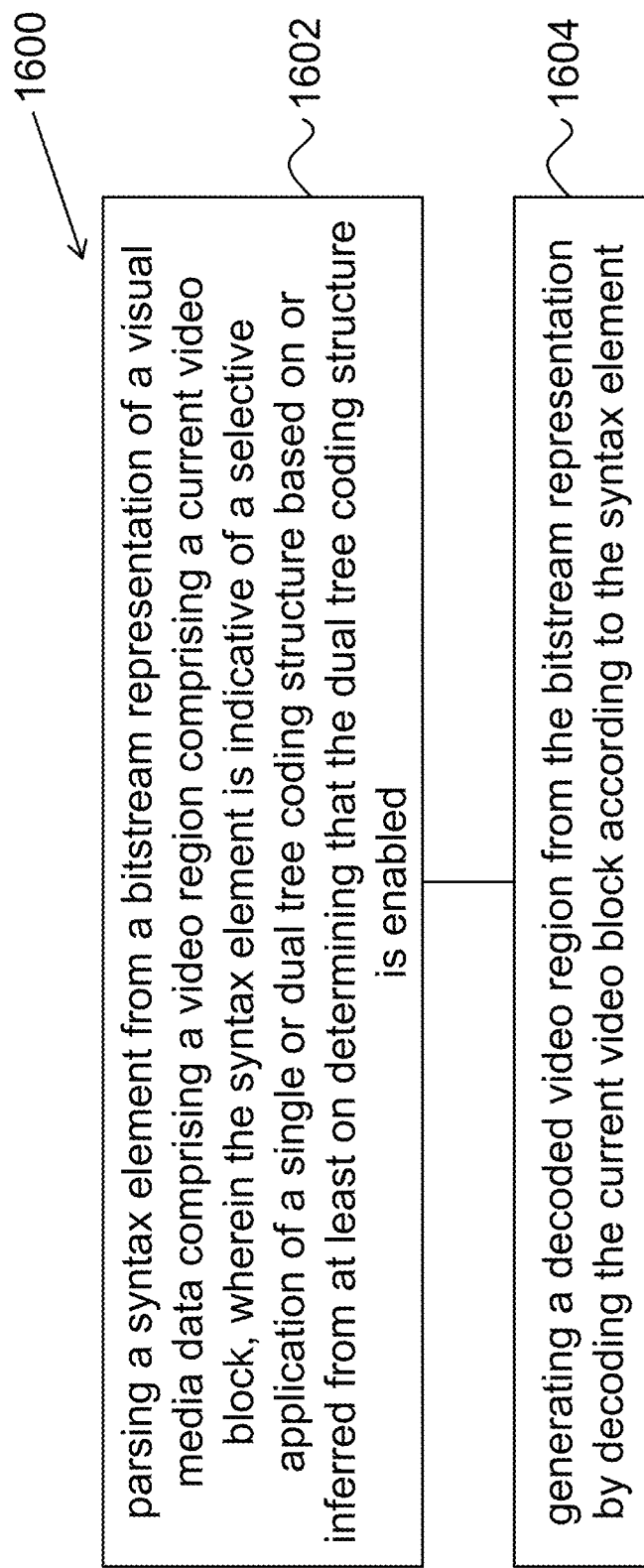
FIG. 16 is a flowchart for an example for a visual media processing method.

FIG. 16 is a flowchart for an example for a visual media processing method. Steps of this flowchart are discussed in connection with example embodiment 9d discussed in Section 4 of this document. At step 1602, the process parses a syntax element from a bitstream representation of a visual media data comprising a video region comprising a current video block, wherein the syntax element is indicative of a selective application of a single or dual tree coding structure based on or inferred from at least on determining that the dual tree coding structure is enabled. At step 1604, the process generates a decoded video region from the bitstream representation by decoding the current video block according to the syntax element.

Figure 17:
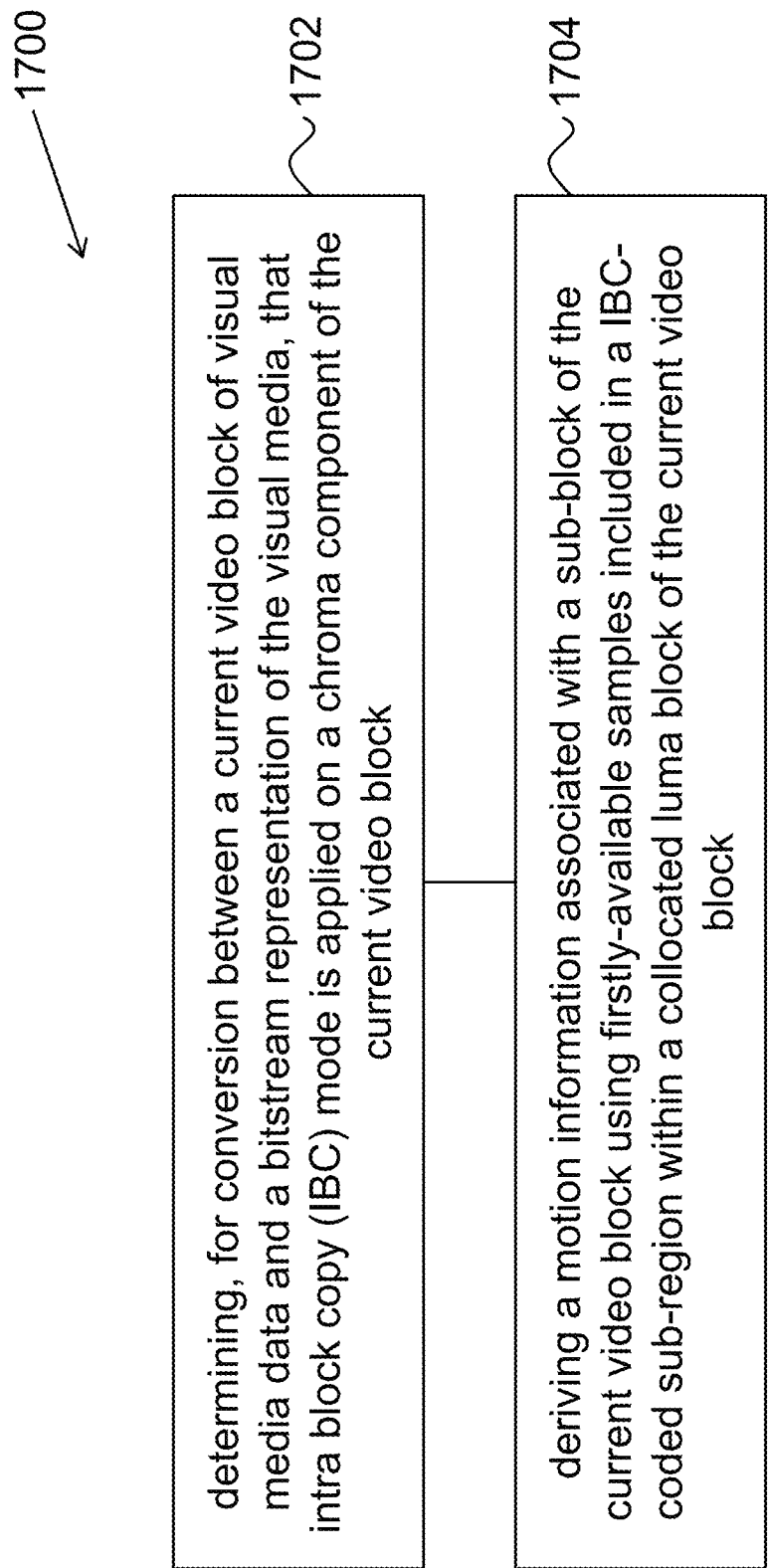
FIG. 17 is a flowchart for an example for a visual media processing method.

FIG. 17 is a flowchart for an example for a visual media processing method. Steps of this flowchart are discussed in connection with example embodiment 16 discussed in Section 4 of this document. At step 1702, the process determines, for conversion between a current video block of visual media data and a bitstream representation of the visual media, that intra block copy (IBC) mode is applied on a chroma component of the current video block. At step 1704, the process derives a motion information associated with a sub-block of the current video block using firstly-available samples included in a IBC-coded sub-region within a collocated luma block of the current video block.

Figure 18:
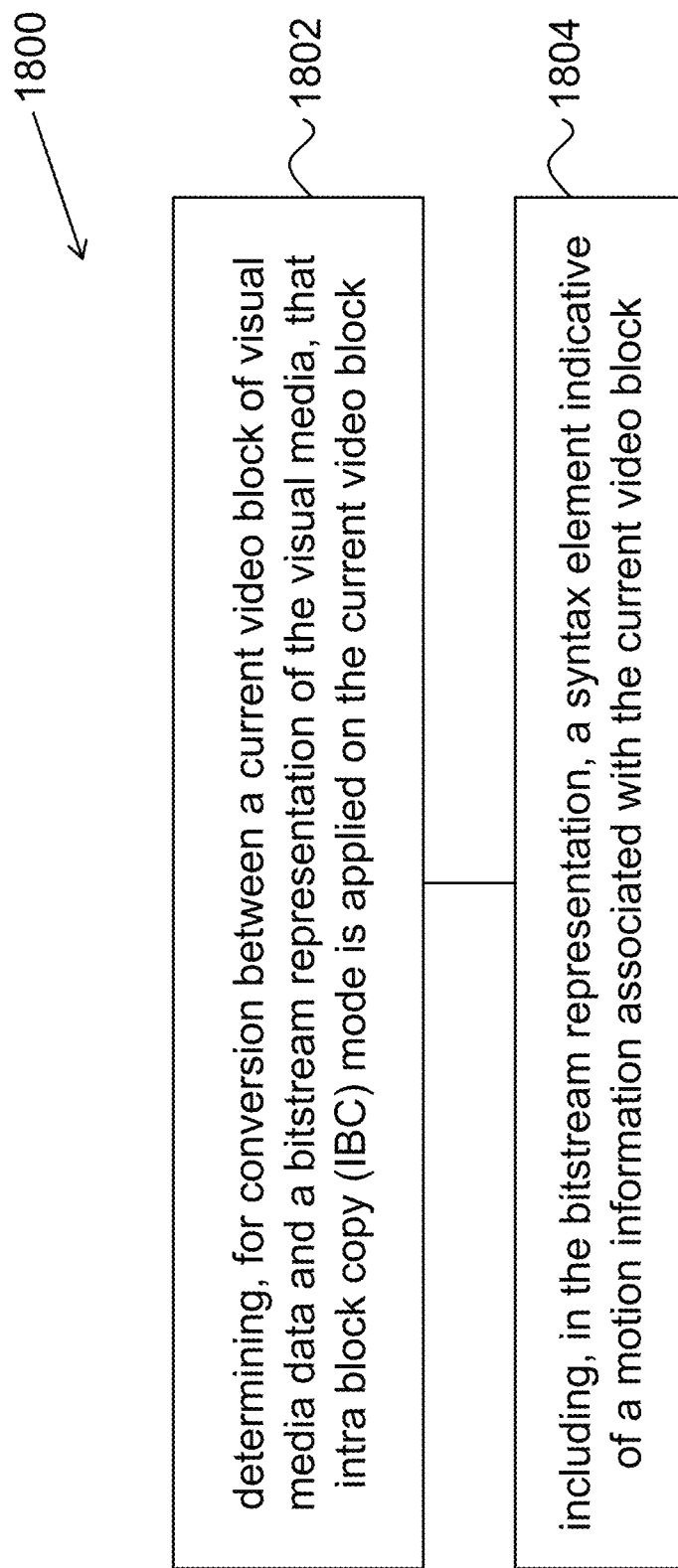
FIG. 18 is a flowchart for an example for a visual media processing method.

FIG. 18 is a flowchart for an example for a visual media processing method. Steps of this flowchart are discussed in connection with example embodiment 17 discussed in Section 4 of this document. At step 1802, the process determines, for conversion between a current video block of visual media data and a bitstream representation of the visual media, that intra block copy (IBC) mode is applied on the current video block. At step 1804, the process includes, in the bitstream representation, a syntax element indicative of a motion information associated with the current video block.

Figure 19:
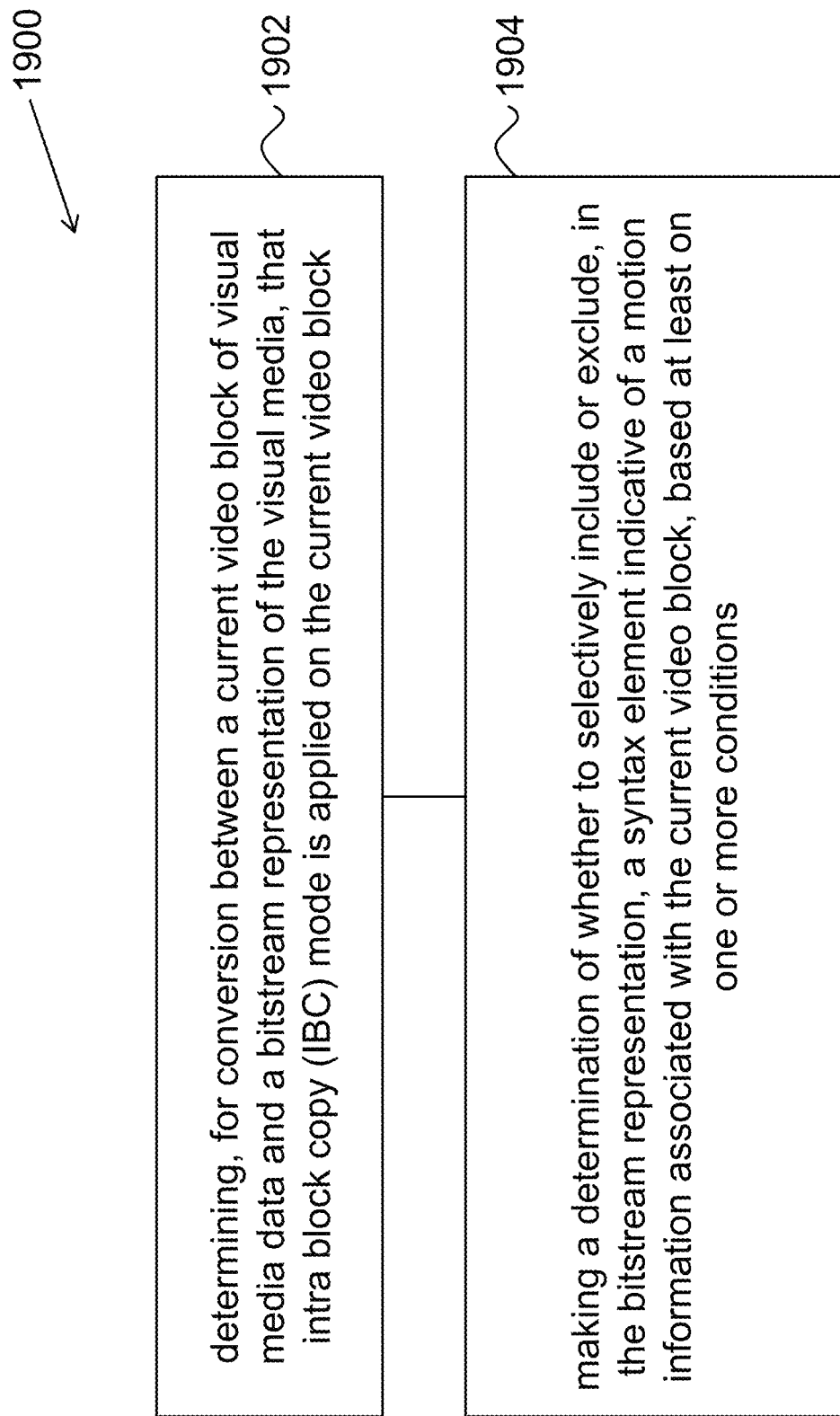
FIG. 19 is a flowchart for an example for a visual media processing method.

FIG. 19 is a flowchart for an example for a visual media processing method. Steps of this flowchart are discussed in connection with example embodiment 17e discussed in Section 4 of this document. At step 1902, the process determines, for conversion between a current video block of visual media data and a bitstream representation of the visual media, that intra block copy (IBC) mode is applied on the current video block. At step 1904, the process makes a determination of whether to selectively include or exclude, in the bitstream representation, a syntax element indicative of a motion information associated with the current video block, based at least on one or more conditions.

Some embodiments of the present document are now presented in clause-based format.

1. A method for visual media encoding, comprising:

for encoding a current video block in a video region of a visual media data into a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

2. A method for visual media decoding, comprising:

for decoding a current video block in a video region of visual media data from a bitstream representation of the visual media data, identifying usage of a coding mode and/or an intra prediction mode and/or a set of allowable intra prediction modes; and upon identifying the usage, making a decision of whether to include or exclude, in the bitstream representation, a syntax element indicative of selectively applying a transform skip mode to the current video block, wherein, in the transform skip mode, a residual of a prediction error between the current video block and a reference video block is represented in the bitstream representation of the visual media data without applying a transformation.

3. The method of any one or more of clauses 1-2, wherein the set of allowable intra prediction modes corresponds to a set of intra modes used in a quantized residual block differential pulse-code modulation (QR-BDPCM) technique on the current video block, and wherein, in the QR-BDPCM technique, a difference between a quantized residual of an intra prediction of the current video block and a prediction of the quantized residual is represented in the bitstream representation of the current video block using a differential pulse coding modulation (DPCM).

4. The method of any one or more of clauses 1-2, wherein the syntax element is excluded from the bitstream representation, if the coding mode belongs to one of a plurality of coding modes used in a QR-BDPCM technique, and wherein, in the QR-BDPCM technique, a difference between a quantized residual of an intra prediction of the current video block and a prediction of the quantized residual is represented in the bitstream representation of the current video block using a differential pulse coding modulation (DPCM).

5. The method of any one or more of clauses 1-2, wherein the syntax element is excluded from the bitstream representation, if the intra prediction mode belongs to a set of intra modes used in a QR-BDPCM technique on the current video block, and wherein, in the QR-BDPCM technique, a difference between a quantized residual of an intra prediction of the current video block and a prediction of the quantized residual is represented in the bitstream representation of the current video block using a differential pulse coding modulation (DPCM).

6. The method of any one or more of clauses 1-2, wherein the syntax element is excluded from the bitstream representation and the transform skip mode is inferred to be applied, in response to determining that a QR-BDPCM technique is applied on the current video block, and wherein, in the QR-BDPCM technique, a difference between a quantized residual of an intra prediction of the current video block and a prediction of the quantized residual is represented in the bitstream representation of the current video block using a differential pulse coding modulation (DPCM).

7. The method of any one or more of clauses 1-6, wherein the selectively applying or skipping the transform skip mode is further based on one or more of the following:
(1) a message signaled in a sequence parameter set (SPS), a video parameter set (VPS), a picture parameter set (PPS), a picture header, a slice header, a tile group header, a largest coding unit (LCU), an LCU row, a group of LCUs or a coding unit (CU),
(2) a block dimension of the current video block or at least one neighboring block of the current video block,
(3) a block shape of the current video block or the at least one neighboring block,
(4) a most probable mode of the current video block or the at least one neighboring block,
(5) a prediction mode of the at least one neighboring block,
(6) an intra prediction mode of the at least one neighboring block,
(7) one or more motion vectors of the at least one neighboring block,
(8) an indication of the QR-BDPCM technique of the at least one neighboring block,
(9) a current quantization parameter (QP) of the current video block or the at least one neighboring block,
(10) an indication of a color format of the current video block,
(11) a separate or dual coding tree structure associated with the current video block
(12) a slice type, a tile group type or a picture type of the current video block, or
(13) a temporal layer ID.

8. A method for visual media decoding, comprising:
for decoding a current video block in a video region of visual media data from a bitstream representation of the visual media data, identifying usage of a coding mode and/or an intra prediction mode and/or a set of allowable intra prediction modes; and
upon identifying the usage, making a decision of whether to include or exclude, in the bitstream representation, a syntax element indicative of selectively applying a transform skip mode to the current video block, wherein, in the transform skip mode, a residual between the current video block and a prediction video block is represented in the bitstream representation of the visual media data without applying a transformation.

9. A method for visual media encoding, comprising:
making a decision, for encoding a current video block in a video region of a visual media data into a bitstream representation of the visual media data, regarding a selective application of a single or dual tree coding structure based on or inferred from at least on determining that the dual tree coding structure is enabled; and
including a syntax element indicative of the selective application of the single or the dual tree in the bitstream representation.

10. A method for visual media decoding, comprising:
parsing a syntax element from a bitstream representation of a visual media data comprising a video region comprising a current video block, wherein the syntax element is indicative of a selective application of a single or dual tree coding structure based on or inferred from at least on determining that the dual tree coding structure is enabled; and
generating a decoded video region from the bitstream representation by decoding the current video block according to the syntax element.

11. The method of anyone or more of clauses 9-10, wherein the dual tree coding structure is associated with a first video level and the syntax element is associated with a second video level, further comprising:
upon determining that the dual tree coding structure associated with the first video level is disabled, inferring the syntax element associated with the second video level as a Boolean false.

12. The method of clause 11, wherein the syntax element is included in the bitstream representation.

13. The method of any one or more of clauses 11-12, wherein the second video level is lower than the first video level.

14. The method of any one or more of clauses 11-12, wherein the second video level is a coding tree unit (CTU) level and the first video level is a sequence/slice/tile/brick level.

15. The method of any one or more of clauses 9-10, wherein the syntax element is associated with a coding tree unit (CTU) level, further comprising:
including the syntax element in the bitstream representation, based at least on a flag being a Boolean true.

16. The method of clause 15, wherein the flag is at a level higher than the CTU level.

17. The method of any one or more of clauses 9-10, wherein the syntax element is associated with a coding tree unit (CTU) level, further comprising:
inferring the syntax element in the bitstream representation as a Boolean false, upon determining that a flag at a level higher than the CTU level is a Boolean false.

18. The method of any one or more of clauses 9-10, wherein the syntax element is at a level below a coding tree unit (CTU) level.

19. The method of clause 18, wherein the syntax element is at a virtual pipeline data unit (VPDU) level.

20. The method of clause 18, wherein the syntax element is at a level corresponding to a signaling level of a partitioning tree.

21. A method for visual media processing, comprising:
determining, for conversion between a current video block of visual media data and a bitstream representation of the visual media, that intra block copy (IBC) mode is applied on a chroma component of the current video block; and
deriving a motion information associated with a sub-block of the current video block using firstly-available samples included in a IBC-coded sub-region within a collocated luma block of the current video block.

22. The method of clause 21, wherein the IBC-coded sub-region within the collocated luma block is scanned in accordance with an order.

23. The method of clause 22, wherein the order is raster scanning order.

24. The method of clause 21, wherein the motion information is a motion vector or a block vector of a sub-block or a sub-sample.

25. The method of clause 21, wherein a size of the IBC-coded sub-region corresponds to a size of a minimum coding unit.

26. The method of clause 21, wherein a size of the IBC-coded sub-region corresponds to a size of a minimum transform unit.

27. The method of clause 22, wherein the firstly-available samples include a top-left sample of the collocated luma block, wherein the top left sample is an IBC-coded sample.

28. The method of clause 22, wherein the firstly-available samples include a top-left sample of the collocated luma block, wherein the top-left sample is an inter mode-coded sample.

29. The method of any one or more of clauses 21-28, wherein the conversion includes generating the bitstream representation from the current video block.

30. The method of any one or more of clauses 21-28, wherein the conversion includes generating pixel values of the current video block from the bitstream representation.

31. A method for visual media processing, comprising:
determining, for conversion between a current video block of visual media data and a bitstream representation of the visual media, that intra block copy (IBC) mode is applied on the current video block; and
including, in the bitstream representation, a syntax element indicative of a motion information associated with the current video block.

32. The method of clause 31, wherein the syntax element corresponds to a difference between the motion information associated with the current video block and a motion information predictor.

33. The method of clause 32, wherein the motion information predictor is computed using motion information of a sample included in a collocated luma block, one or more neighboring blocks of the collocated luma block, or neighboring chroma blocks of the current video block.

34. The method of clause 32, wherein the sample included in the collocated luma block is a top-left sample of the collocated luma block.

35. The method of clause 32, wherein the sample included in the collocated luma block is a center sample of the collocated luma block.

36. The method of clause 34, wherein the top-left sample of the collocated luma block is an IBC-coded sample.

37. The method of clause 34, wherein the top-left sample of the collocated luma block is an inter mode-coded sample.

38. The method of clause 33, wherein the motion information predictor is associated with a sub-region of the collocated luma block, and wherein the motion information predictor is scaled prior to use on the current video block.

39. The method of clause 33, wherein the neighboring chroma blocks are adjacent or non-adjacent neighbors of the current video block.

40. The method of clause 31, wherein the motion information associated with the current video block is included in a candidate motion vector list, and wherein the syntax element included in the bitstream representation corresponds to an index pointing to the candidate motion vector list.

41. The method of clause 31, wherein the candidate motion vector list includes motion information of samples included in one of: a collocated luma block, one or more neighboring blocks of the collocated luma block, or neighboring chroma blocks of the current video block.

42. The method of clause 32, wherein an indication of a use of adaptive motion vector resolution (AMVR) technique is inferred based, at least in part, on parsing the bitstream representation.

43. The method of clause 42, wherein the current video block is a chroma, IBC-coded block, further comprising:
inferring, using the indication of the use of the AMVR technique, that the AMVR technique is not applied on the current video block.

44. The method of clause 43, wherein the difference between the motion information associated with the current video block and the motion information predictor is inferred to be of an integer-valued precision.

45. The method of any one or more of clauses 31-44, wherein the conversion includes generating the bitstream representation from the current video block.

46. The method of any one or more of clauses 31-44, wherein the conversion includes generating pixel values of the current video block from the bitstream representation.

47. A method for visual media processing, comprising:
determining, for conversion between a current video block of visual media data and a bitstream representation of the visual media, that intra block copy (IBC) mode is applied on the current video block; and
making a determination of whether to selectively include or exclude, in the bitstream representation, a syntax element indicative of a motion information associated with the current video block, based at least on one or more conditions.

48. The method of clause 47, wherein the one or more conditions include:
(1) IBC coding mode of sub-regions within a collocated luma block of the current video block,
(2) valid motion vectors associated with IBC coded sub-regions within a collocated luma block of the current video block,
(3) a message signaled in a sequence parameter set (SPS), a video parameter set (VPS), a picture parameter set (PPS), a picture header, a slice header, a tile group header, a largest coding unit (LCU), an LCU row, a group of LCUs or a coding unit (CU),
(4) a hash hit ratio of IBC modes and/or inter modes in coded pictures/tiles/slices/reconstructed regions associated with other video blocks,
(5) a block dimension of the current video block or at least one neighboring block of the current video block,
(6) a block shape of the current video block or the at least one neighboring block,
(7) a current quantization parameter (QP) of the current video block or the at least one neighboring block,
(8) an indication of a color format of the current video block,
(9) a separate or dual coding tree structure associated with the current video block
(10) a slice type, a tile group type or a picture type of the current video block, or
(11) a temporal layer ID.

49. The method of clause 48, wherein the syntax element is excluded from the bitstream representation, in response to determining that all sub-regions within the collocated luma block of the current video block are IBC-coded.

50. The method of clause 48, wherein the syntax element is excluded from the bitstream representation, in response to determining that all motion vectors associated with all IBC coded sub-regions within a collocated luma block of the current video block are valid.

51. The method of any one or more of clauses 47-48, wherein the conversion includes generating the bitstream representation from the current video block.

52. The method of any one or more of clauses 47-48, wherein the conversion includes generating pixel values of the current video block from the bitstream representation.

53. A video encoder apparatus comprising a processor configured to implement a method recited in any one or more of clauses 1-52.

54. A video decoder apparatus comprising a processor configured to implement a method recited in any one or more of clauses 1-52.

55. A computer readable medium having code stored thereon, the code embodying processor-executable instructions for implementing a method recited in any one or more of clauses 1-52.

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

5. Additional Embodiments of the Disclosed Technology

5.1 Dual Tree Related Embodiment

The proposed changes to the draft provided by JVET-N1001-v7 are presented below as follows. The text to be added are shown in bolded, italicized font. The text to be deleted is shown in bolded, capitalized font.

5.1.1 Embodiment #1

| | Descriptor |
|---|---|
| seq_parameter_set_rbsp( ) { | |
| ...... | |
|   qtbtt_dual_tree_intra_flag | u(1) |
|   if( qtbtt_dual_tree_intra_flag ) | |
|     sps_asdt_flag | u(1) |
|   partition_constraints_override_enabled_flag | u(1) |
| ...... | |

5.1.2 Embodiment #2

7.3.2.3 Sequence Parameter Set RBSP Syntax

| | Descriptor |
|---|---|
| seq_parameter_set_rbsp( ) { | |
|   sps_decoding_parameter_set_id | u(4) |
|   ... | |
|   sps_mmvd_enabled_flag | u(1) |
|   ... | |
|   if( sps_mmvd_enabled_flag) | |
|     sps_fpel_mmvd_enabled_flag | u(1) |
|   *sps_asdt_flag* | *u(1)* |
|   sps_triangle_enabled_flag | u(1) |
|   ... | |
| } | |

5.1.3 Embodiment #3

7.3.5 Slice Header Syntax

7.3.5.1 General Slice Header Syntax

| | Descriptor |
|---|---|
| slice_header( ) { | |
|   slice_pic_parameter_set_id | ue(v) |
|   ... | |
|   if ( slice_type != I ) { | |
|     ... | |
|     } | |
|     if( ( weighted_pred_flag && slice_type = = P) \|\| | |
|       ( weighted_bipred_flag && slice_type = = B ) ) | |
|     ... | |
|   } else if ( sps_ jbc_enabled_flag ) | |
|     six_minus_max_num_merge_cand | ue(v) |
|     *if( sps_asdt_flag )* | |
|       *slice_asdt_flag* | *u(1)* |
|   slice_qp_delta | se(v) |
|   ... | |
| } | | sps_asdt_flag equal to 1 specifies that the proposed method can be enabled on the current sequence. It equals to 0 specifies that the proposed method cannot be enabled on the current sequence. When sps_ASDT_flag is not present, it is inferred to be equal to 0.

slice_asdt_flag equal to 1 specifies that the proposed method can be enabled on the current slice. It equals to 0 specifies that the proposed method cannot be enabled on the current slice. When slice_ASDT_flag is not present, it is inferred to be equal to 0.

7.3.7.2 Coding Tree Unit Syntax

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   ... | |
|   if(slice_asdt_flag) | |
|     *ctu_dual_tree_intra_flag* | *ae(v)* |
|     if( slice_type = = I && QTBTT_DUAL_TREE_INTRA_FLAG&&*ctu_dual_tree_intra_flag* ) | |

| | Descriptor |
|---|---|
|     dual_tree_implicit_qt_split ( xCtb, yCtb, CtbSizeY, 0 )<br>  Else<br>    coding_tree( xCtb, yCtb, CtbSizeY, CtbSizeY, 1, 0, 0, 0, 0, 0, SINGLE_TREE )<br>} | | ctu_dual_tree_intra_flag equal to 1 specifies that the current CTU employs dual tree coding structure. It equals to 0 specifies that the current CTU employs single tree coding structure. When ctu_dual_tree_intra_flag is not present, it is inferred to be equal to 0.

5.1.4 Embodiment #4

7.3.5 Slice Header Syntax

7.3.5.1 General Slice Header Syntax

| | Descriptor |
|---|---|
| slice_header( ) {<br>  slice_pic_parameter_set_id<br>  ...<br>  if ( slice_type != I) {<br>  ...<br>  }<br>  if( ( weighted_pred_flag && slice_type = = P) \|\|<br>    (weighted_bipred_flag && slice_type = = B ) )<br>  ... | ue(v) |

| -continued | |
|---|---|
| | Descriptor |
|   } else if ( sps_ibc_enabled_flag )<br>    six_minus_max_num_merge_cand<br>  if( sps_asdt_flag && qtbtt_dual_tree_intra_flag)<br>    slice_asdt_flag<br>  slice_qp_delta<br>  ...<br>} | ue(v)<br><br>u(1)<br>se(v) | sps_asdt_flag equal to 1 specifies that the proposed method can be enabled on the current sequence. It equals to 0 specifies that the proposed method cannot be enabled on the current sequence. When sps_ASDT_flag is not present, it is inferred to be equal to 0.

slice_asdt_flag equal to 1 specifies that the proposed method can be enabled on the current slice. It equals to 0 specifies that the proposed method cannot be enabled on the current slice. When slice_ASDT_flag is not present, it is inferred to be equal to 0.

7.3.7.2 Coding Tree Unit Syntax

| | Descriptor |
|---|---|
| coding_tree_unit( ) {<br>  xCtb = ( CtbAddrInRs % PicWidthInCtbsY ) << CtbLog2SizeY<br>  yCtb = ( CtbAddrInRs / PicWidthInCtbsY ) << CtbLog2SizeY<br>  ...<br>  if(slice_asdt_flag)<br>    ctu_ dual_tree_intra_flag<br>      if( slice_type = = I && qtbn_dual_tree_intra_flag && ctu_ dual_tree_intra_flag )<br>        dual_tree_implicit_qt_split ( xCtb, yCtb, CtbSizeY, 0 )<br>      else<br>        coding_tree( xCtb, yCtb, CtbSizeY, CtbSizeY, 1, 0, 0, 0, 0, 0, SINGLE TREE )<br>} | <br><br><br><br><br>ue(v) | ctu_dual_tree_intra_flag equal to 1 specifies that the current CTU employs dual tree coding structure. It equals to 0 specifies that the current CTU employs single tree coding structure. When ctu_dual_tree_intra_flag is not present, it is inferred to be equal to 0.

5.2 IBC Related Embodiment

7.3.7.5 Coding Unit Syntax

|  | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|     !( cbWidth = = 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) ) | |
|       pred_mode_flag | ae(v) |
|     if( ( ( slice_type = = I && cu_skip_flag[ x0 ][ y0 ] = = 0) \|\| | |
|     ( slice_type != I && ( CuPredMode[ x0 ][ y0 ] != MODE_INTRA \|\| | |
|     ( cbWidth = = 4 && cbHeight == 4 && cu_skip_flag[ x0 ][ y0 ] = = 0 ) ) ) ) | |
| && | |
|     sps_ibc_enabled_flag && ( cbWidth != 128 \|\| cbHeight != 128 ) && (treeType != DUAL_TREE_CHROMA) | |
|       pred_mode_ibc_flag | ae(v) |
|   } | |
|   ... | |
| } | |

8.6 Decoding Process for Coding Units Coded in IBC Prediction Mode

8.6.1 General Decoding Process for Coding Units Coded in IBC Prediction Mode Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in ibc prediction mode consists of the following ordered steps:

1. The motion vector components of the current coding unit are derived as follows:
    1. IF TREETYPE IS EQUAL TO SINGLE_TREE OR DUAL_TREE_LUMA, THE FOLLOWING APPLIES:
        The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
        When treeType is equal to SINGLE_TREE, the derivation process for chroma motion vectors in clause 8.6.2.5 is invoked with luma motion vector mvL[0][0] as input, and chroma motion vector mvC[0][0] as output.
        The number of luma coding subblocks in horizontal direction numSbX and in vertical direction numSbY are both set equal to 1.
    1. OTHERWISE, IF TREETYPE IS EQUAL TO DUAL_TREE_CHROMA, THE FOLLOWING APPLIES:
        THE NUMBER OF LUMA CODING SUB-BLOCKS IN HORIZONTAL DIRECTION NUMSBX AND IN VERTICAL DIRECTION NUMSBY ARE DERIVED AS FOLLOWS:

NUMSBX=(CBWIDTH>>2)     (8-871)

NUMSBY=(CBHEIGHT>>2)     (8-872)

THE CHROMA MOTION VECTORS MVC[XSBIDX][YSBIDX] ARE DERIVED AS FOLLOWS FOR XSBIDX=0 . . . NUMSBX−1, YSBIDX=0 . . . NUMSBY−1:
THE LUMA MOTION VECTOR MVL[XSBIDX][YSBIDX] IS DERIVED AS FOLLOWS:
THE LOCATION (XCUY, YCUY) OF THE COLLOCATED LUMA CODING UNIT IS DERIVED AS FOLLOWS:

XCUY=XCB+XSBIDX*4     (8-873)

YCUY=YCB+YSBIDX*4     (8-874)

IF CUPREDMODE[XCUY][YCUY] IS EQUAL TO MODE_INTRA, THE FOLLOWING APPLIES.

MVL[XSBIDX][YSBIDX][0]=0     (8-875)

MVL[XSBIDX][YSBIDX][1]=0     (8-876)

PREDFLAGL0[XSBIDX][YSBIDX]=0     (8-877)

PREDFLAGL1[XSBIDX][YSBIDX]=0     (8-878)

OTHERWISE (CUPREDMODE[XCUY][YCUY] IS EQUAL TO MODE_IBC), THE FOLLOWING APPLIES:

MVL[XSBIDX][YSBIDX][0]=MVL0[XCUY][YCUY][0]  (8-879)

MVL[XSBIDX][YSBIDX][1]=MVL0[XCUY][YCUY][1]  (8-880)

PREDFLAGL0[XSBIDX][YSBIDX]=1  (8-881)

PREDFLAGL1[XSBIDX][YSBIDX]=0  (8-882)

THE DERIVATION PROCESS FOR CHROMA MOTION VECTORS IN CLAUSE 8.6.2.5 IS INVOKED WITH MVL[XSBIDX][YSBIDX] AS INPUTS, AND MVC[XSBIDX][YSBIDX] AS OUTPUT.

IT IS A REQUIREMENT OF BITSTREAM CONFORMANCE THAT THE CHROMA MOTION VECTOR MVC[XSBIDX][YSBIDX] SHALL OBEY THE FOLLOWING CONSTRAINTS:

WHEN THE DERIVATION PROCESS FOR BLOCK AVAILABILITY AS SPECIFIED IN CLAUSE 6.4.X [ED. (BB): NEIGHBOURING BLOCKS AVAILABILITY CHECKING PROCESS TBD] IS INVOKED WITH THE CURRENT CHROMA LOCATION(XCURR, YCURR) SET EQUAL TO (XCB/SUBWIDTHC, YCB/SUBHEIGHTC) AND THE NEIGHBOURING CHROMA LOCATION (XCB/SUBWIDTHC+(MVC[XSBIDX][YSBIDX][0]>>5), YCB/SUBHEIGHTC+(MVC[XSBIDX][YSBIDX][1]>>5)) AS INPUTS, THE OUTPUT SHALL BE EQUAL TO TRUE.

WHEN THE DERIVATION PROCESS FOR BLOCK AVAILABILITY AS SPECIFIED IN CLAUSE 6.4.X [ED. (BB): NEIGHBOURING BLOCKS AVAILABILITY CHECKING PROCESS TBD] IS INVOKED WITH THE CURRENT CHROMA LOCATION(XCURR, YCURR) SET EQUAL TO (XCB/SUBWIDTHC, YCB/SUBHEIGHTC) AND THE NEIGHBOURING CHROMA LOCATION (XCB/SUBWIDTHC+(MVC[XSBIDX][YSBIDX][0]>>5)+CBWIDTH/SUBWIDTHC-1, YCB/SUBHEIGHTC+(MVC[XSBIDX][YSBIDX][1]>>5)+CBHEIGHT/SUBHEIGHTC-1) AS INPUTS, THE OUTPUT SHALL BE EQUAL TO TRUE.

ONE OR BOTH OF THE FOLLOWING CONDITIONS SHALL BE TRUE:

(MVC[XSBIDX][YSBIDX][0]>>5)+XSBIDX*2+2 IS LESS THAN OR EQUAL TO 0.

(MVC[XSBIDX][YSBIDX][1]>>5)+YSBIDX*2+2 IS LESS THAN OR EQUAL TO 0.

2. The prediction samples of the current coding unit are derived as follows:

IF TREETYPE IS EQUAL TO SINGLE_TREE OR DUAL_TREE_LUMA, THE PREDICTION SAMPLES OF THE CURRENT CODING UNIT ARE DERIVED AS FOLLOWS:

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 ... numSbX−1, and ySbIdx=0 ... numSbY−1, the variable cIdx set equal to 0 as inputs, and the ibc prediction samples (predSamples) that are an (cbWidth)×(cbHeight) array predSamples$_L$ of prediction luma samples as outputs.

Otherwise if treeType is equal to SINGLE_TREE or DUAL_TREE_CHROMA, the prediction samples of the current coding unit are derived as follows:

The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 ... numSbX−1, and ySbIdx=0 ... numSbY−1 and the variable cIdx set equal to 1 as inputs, and the ibc prediction samples (predSamples) that are an (cbWidth/2)×(cbHeight/2) array predSamples$_{Cb}$, of prediction chroma samples for the chroma components Cb as outputs.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 ... numSbX−1, and ySbIdx=0 ... numSbY−1 and the variable cIdx set equal to 2 as inputs, and the ibc prediction samples (predSamples) that are an (cbWidth/2)×(cbHeight/2) array predSamples$_{Cr}$, of prediction chroma samples for the chroma components Cr as outputs.

3. The variables NumSbX[xCb][yCb] and NumSbY[xCb][yCb] are set equal to numSbX and numSbY, respectively.

4. The residual samples of the current coding unit are derived as follows:

WHEN TREETYPE IS EQUAL TO SINGLE_TREE OR TREETYPE IS EQUAL TO DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE OR TREETYPE IS EQUAL TO DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$, as output.

When treeType is equal to SINGLE_TREE OR TREE-TYPE IS EQUAL TO DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

WHEN TREETYPE IS EQUAL TO SINGLE_TREE OR TREETYPE IS EQUAL TO DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE OR TREE-TYPE IS EQUAL TO DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE OR TREE-TYPE IS EQUAL TO DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

What is claimed is:

1. A method of processing video data, comprising:
determining, during a conversion between a current video block in a video region of a video and a bitstream of the video, whether a block-based delta pulse code modulation mode is enabled or disabled for the current video block, wherein, in the block-based delta pulse code modulation mode, differences between quantized residuals derived with an intra prediction mode of the current video block and predictions of the quantized residuals are included in the bitstream; and
performing the conversion based on the determining,
wherein a first syntax element indicating whether a transform skip mode is applied to a transform block of the current video block is conditionally included in the bitstream based on whether the block-based delta pulse code modulation mode is enabled or disabled for the current video block, and wherein, in the transform skip mode, a transform is skipped for a prediction residual; and
wherein the transform skip mode is inferred to be applied in response to determining that the block-based delta pulse code modulation mode is enabled.

2. The method of claim 1, wherein the first syntax element is excluded from the bitstream in response to the block-based delta pulse code modulation mode being enabled.

3. The method of claim 1, wherein whether the first syntax element is included in the bitstream is based on a block dimension of the transform block of the current video block.

4. The method of claim 1, wherein whether the first syntax element is included in the bitstream is based on a coding tree structure of the current video block.

5. The method of claim 4, wherein the first syntax element is included in the bitstream under conditions including a condition that the current video block is in a single tree structure.

6. The method of claim 4, wherein the first syntax element is included in the bitstream under conditions including a condition that the current video block is in a dual tree luma structure.

7. The method of claim 1, wherein when the first syntax element is not present in the bitstream, the transform skip mode is inferred to be enabled in response to a value of a second syntax element included in the bitstream indicating that the block-based delta pulse code modulation mode is enabled.

8. The method of claim 7, wherein the second syntax element is included in the bitstream is under conditions including a condition that a size of the current video block is smaller than or equal to a threshold.

9. The method of claim 7, wherein in response to the value of the second syntax element indicating that the block-based delta pulse code modulation mode is enabled, a third syntax element which indicates that a prediction direction of the block-based delta pulse code modulation mode for residual samples applied to the current video block is a vertical direction or a horizontal direction is included in the bitstream.

10. The method of claim 1, wherein the differences are represented using a block based differential pulse coding modulation representation.

11. The method of claim 1, wherein the conversion includes encoding the current video block into the bitstream.

12. The method of claim 1, wherein the conversion includes decoding the current video block from the bitstream.

13. An apparatus for processing video data comprising a processor and a non-transitory memory with instructions thereon, wherein the instructions upon execution by the processor, cause the processor to:
determine, during a conversion between a current video block in a video region of a video and a bitstream of the video, whether a block-based delta pulse code modulation mode is enabled or disabled for the current video block, wherein, in the block-based delta pulse code modulation mode, differences between quantized residuals derived with an intra prediction mode of the current video block and predictions of the quantized residuals are included in the bitstream; and
perform the conversion based on the determining,
wherein a first syntax element indicating whether a transform skip mode is applied to a transform block of the current video block is conditionally included in the bitstream based on whether the block-based delta pulse code modulation mode is enabled or disabled for the current video block, and wherein, in the transform skip mode, a transform is skipped for a prediction residual; and wherein the transform skip mode is inferred to be applied in response to determining that the block-based delta pulse code modulation mode is enabled.

14. The apparatus of claim 13, wherein the first syntax element is excluded from the bitstream in response to the block-based delta pulse code modulation mode being enabled.

15. The apparatus of claim 13, wherein when the first syntax element is not present in the bitstream, the transform skip mode is inferred to be enabled in response to a value of a second syntax element included in the bitstream indicating that the block-based delta pulse code modulation mode is enabled, and wherein the second syntax element is included in the bitstream is under conditions including a condition that a size of the current video block is smaller than or equal to a threshold.

16. The apparatus of claim 13, wherein whether the first syntax element is included in the bitstream is based on a coding tree structure of the current video block.

17. A non-transitory computer-readable storage medium storing instructions that cause a processor to:

determine, during a conversion between a current video block in a video region of a video and a bitstream of the video, whether a block-based delta pulse code modulation mode is enabled or disabled for the current video block, wherein, in the block-based delta pulse code modulation mode, differences between quantized residuals derived with an intra prediction mode of the current video block and predictions of the quantized residuals are included in the bitstream; and perform the conversion based on the determining, wherein a first syntax element indicating whether a transform skip mode is applied to a transform block of the current video block is conditionally included in the bitstream based on whether the block-based delta pulse code modulation mode is enabled or disabled for the current video block, and wherein, in the transform skip mode, a transform is skipped for a prediction residual; and wherein the transform skip mode is inferred to be applied in response to determining that the block-based delta pulse code modulation mode is enabled.

18. The non-transitory computer-readable storage medium of claim 17, wherein the first syntax element is excluded from the bitstream in response to the block-based delta pulse code modulation mode being enabled, wherein when the first syntax element is not present in the bitstream, the transform skip mode is inferred to be enabled in response to a value of a second syntax element included in the bitstream indicating that the block-based delta pulse code modulation mode is enabled, and wherein the second syntax element is included in the bitstream is under conditions including a condition that a size of the current video block is smaller than or equal to a threshold.

19. A method for storing a bitstream of a video, comprising:

determining whether a block-based delta pulse code modulation mode is enabled or disabled for a current video block in a video region of a video, wherein, in the block-based delta pulse code modulation mode, differences between quantized residuals derived with an intra prediction mode of the current video block and predictions of the quantized residuals are included in the bitstream;

generating the bitstream based on the determining, wherein a first syntax element indicating whether a transform skip mode is applied to a transform block of the current video block is conditionally included in the bitstream based on whether the block-based delta pulse code modulation mode is enabled or disabled for the current video block, wherein, in the transform skip mode, a transform is skipped for a prediction residual, and wherein the transform skip mode is inferred to be applied in response to determining that the block-based delta pulse code modulation mode is enabled; and storing the bitstream in a non-transitory computer-readable recording medium.

20. The method of claim 19, wherein the first syntax element is excluded from the bitstream in response to the block-based delta pulse code modulation mode being enabled, wherein when the first syntax element is not present in the bitstream, the transform skip mode is inferred to be enabled in response to a value of a second syntax element included in the bitstream indicating that the block-based delta pulse code modulation mode is enabled, and wherein the second syntax element is included in the bitstream is under conditions including a condition that a size of the current video block is smaller than or equal to a threshold.

* * * * *